(12) United States Patent
Nagasawa

(10) Patent No.: US 10,591,973 B2
(45) Date of Patent: Mar. 17, 2020

(54) INFORMATION PROCESSING APPARATUS CONFIGURED TO CHANGE A CONTROL RELATED TO POWER CONSUMPTION

(71) Applicant: Yuichi Nagasawa, Kanagawa (JP)

(72) Inventor: Yuichi Nagasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 15/899,810

(22) Filed: Feb. 20, 2018

(65) Prior Publication Data

US 2018/0267592 A1  Sep. 20, 2018

(30) Foreign Application Priority Data

Mar. 15, 2017  (JP) .................................. 2017-049846

(51) Int. Cl.
    *G06F 1/26*      (2006.01)
    *G06F 1/32*      (2019.01)
    *G06F 1/3231*    (2019.01)
    *H04N 1/00*      (2006.01)

(52) U.S. Cl.
    CPC ....... *G06F 1/3231* (2013.01); *H04N 1/00891* (2013.01); *H04N 1/00896* (2013.01); *H04N 2201/0094* (2013.01)

(58) Field of Classification Search
    None
    See application file for complete search history.

(56) References Cited

U.S. PATENT DOCUMENTS

| 9,065,955 | B2 * | 6/2015 | Baba .................. H04N 1/00323 |
| 9,116,484 | B2 | 8/2015 | Masumoto et al. |
| 9,338,319 | B2 | 5/2016 | Oyoshi |
| 9,575,547 | B2 | 2/2017 | Nagasawa |
| 9,712,707 | B2 | 7/2017 | Nagasawa |
| 9,832,325 | B2 | 11/2017 | Nagasawa |

(Continued)

FOREIGN PATENT DOCUMENTS

| JP | H06-066954 | 3/1994 |
| JP | H06-075444 | 3/1994 |

(Continued)

*Primary Examiner* — Nitin C Patel
(74) *Attorney, Agent, or Firm* — IPUSA, PLLC

(57) ABSTRACT

An information processing apparatus that can communicate with another information processing apparatus is provided. The information processing apparatus includes a detection device and a processor that is configured to execute processes of detecting a passerby passing a detection range of the detection device that is formed in at least a part of a region surrounding the information processing apparatus; transmitting to the other information processing apparatus, a passerby notification indicating that the detected passerby is approaching the other information processing apparatus; receiving from the other information processing apparatus, a use notification indicating that the other information processing apparatus has been used; determining that the information processing apparatus has not been preferentially used upon receiving the use notification from the other information processing apparatus; and changing a control related to power consumption depending on whether the processor has determined that the information processing apparatus has not been preferentially used.

10 Claims, 15 Drawing Sheets

(56) References Cited

U.S. PATENT DOCUMENTS

| | | | |
|---|---|---|---|
| 2002/0089694 A1* | 7/2002 | Idehara | G03G 15/2003 358/1.15 |
| 2003/0089839 A1* | 5/2003 | Butikofer | G05B 19/042 250/208.1 |
| 2006/0029412 A1* | 2/2006 | Kato | G03G 15/5004 399/80 |
| 2011/0109937 A1* | 5/2011 | Fujiki | H04N 1/00885 358/1.15 |
| 2011/0296163 A1* | 12/2011 | Abernethy | G06F 1/3203 713/100 |
| 2012/0204046 A1* | 8/2012 | Baba | G06F 1/3231 713/323 |
| 2013/0063778 A1 | 3/2013 | Nagasawa | |
| 2015/0006927 A1* | 1/2015 | Ono | G06F 1/3231 713/320 |
| 2015/0070725 A1* | 3/2015 | Monden | G06F 3/1232 358/1.15 |
| 2015/0234474 A1 | 8/2015 | Yokoyama et al. | |
| 2017/0142279 A1 | 5/2017 | Yokoyama | |
| 2017/0279994 A1* | 9/2017 | Oshima | G06F 3/1222 |

FOREIGN PATENT DOCUMENTS

| | | |
|---|---|---|
| JP | 2009-093408 | 4/2009 |
| JP | 2009-277057 | 11/2009 |
| JP | 2010-218120 | 9/2010 |
| JP | 2011-061309 | 3/2011 |
| JP | 2011-237857 | 11/2011 |
| JP | 2012-195712 | 10/2012 |
| JP | 2013-077295 | 4/2013 |
| JP | 2013-186211 | 9/2013 |
| JP | 5300451 | 9/2013 |
| JP | 2014-135021 | 7/2014 |
| JP | 2015-150742 | 8/2015 |
| JP | 2015-154377 | 8/2015 |
| JP | 5783153 | 9/2015 |
| JP | 5813055 | 11/2015 |
| JP | 5870882 | 3/2016 |
| JP | 2016-092765 | 5/2016 |
| JP | 5942724 | 6/2016 |
| JP | 2016-176710 | 10/2016 |
| JP | 2017-103579 | 6/2017 |

* cited by examiner

FIG.4
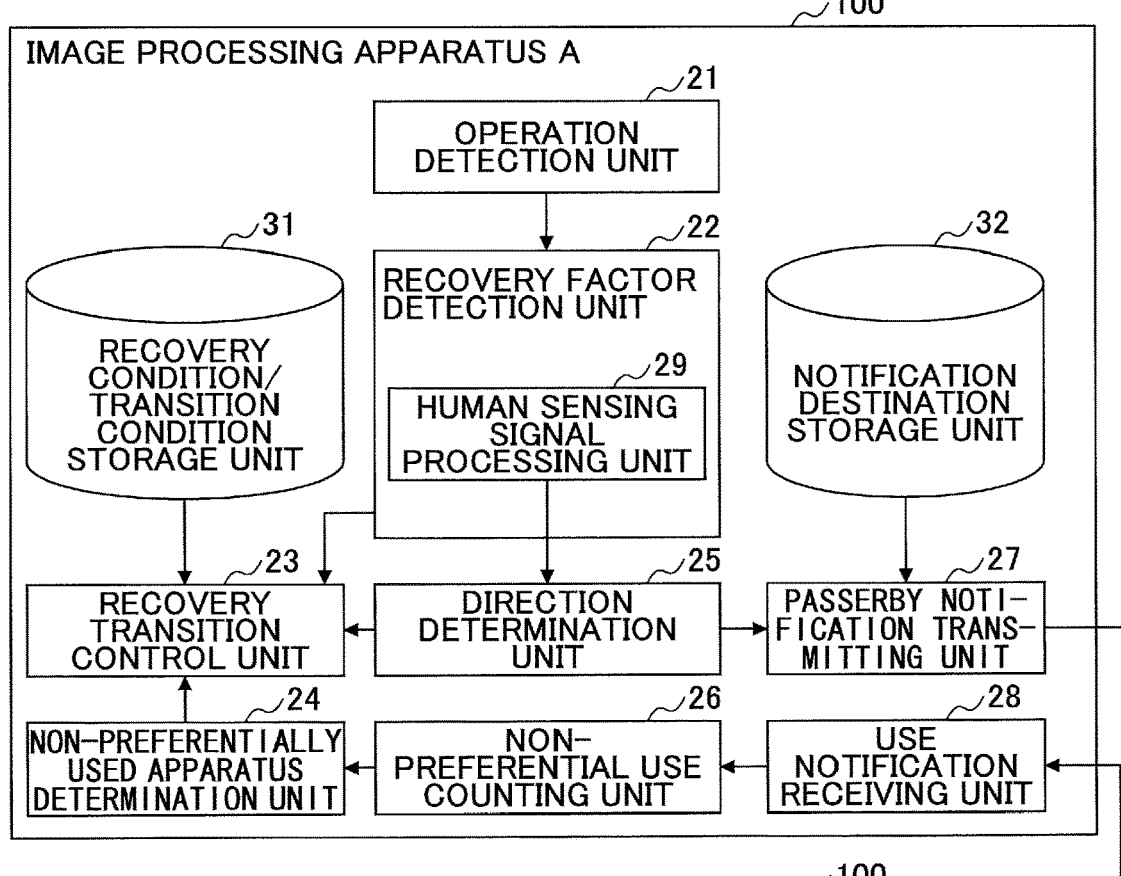
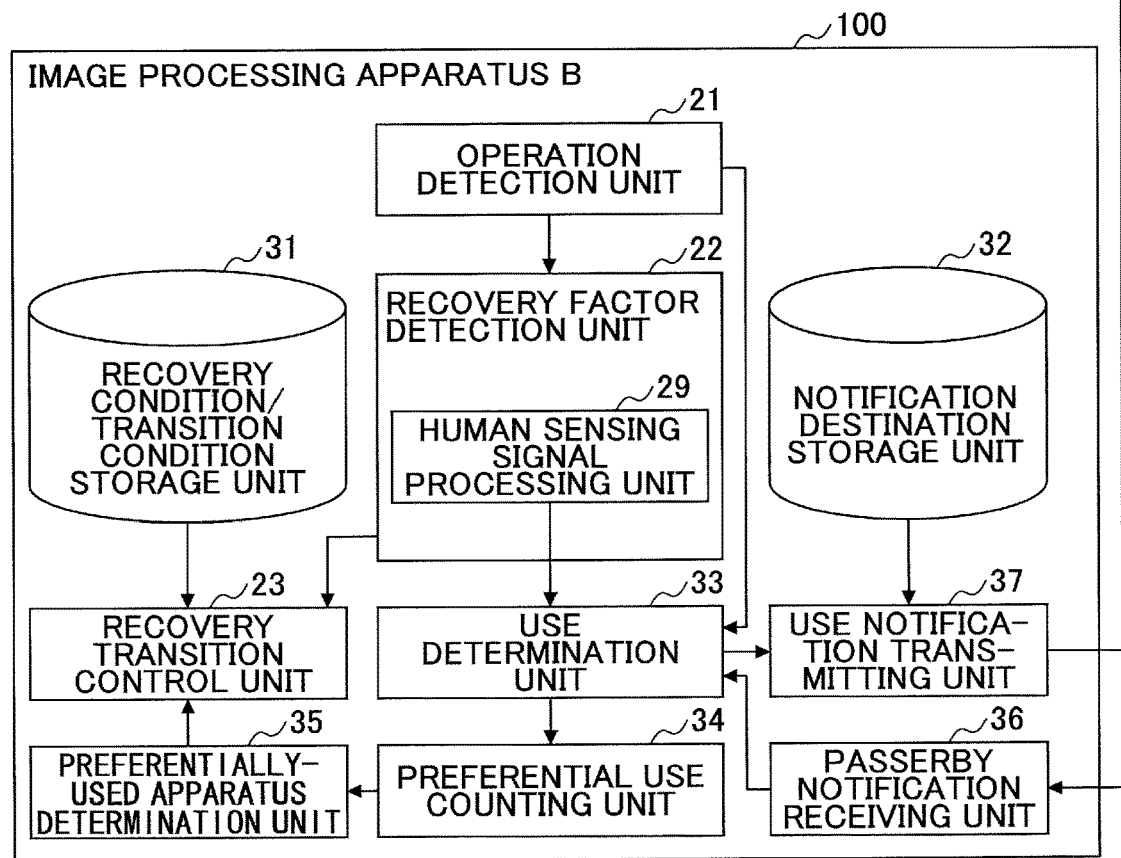

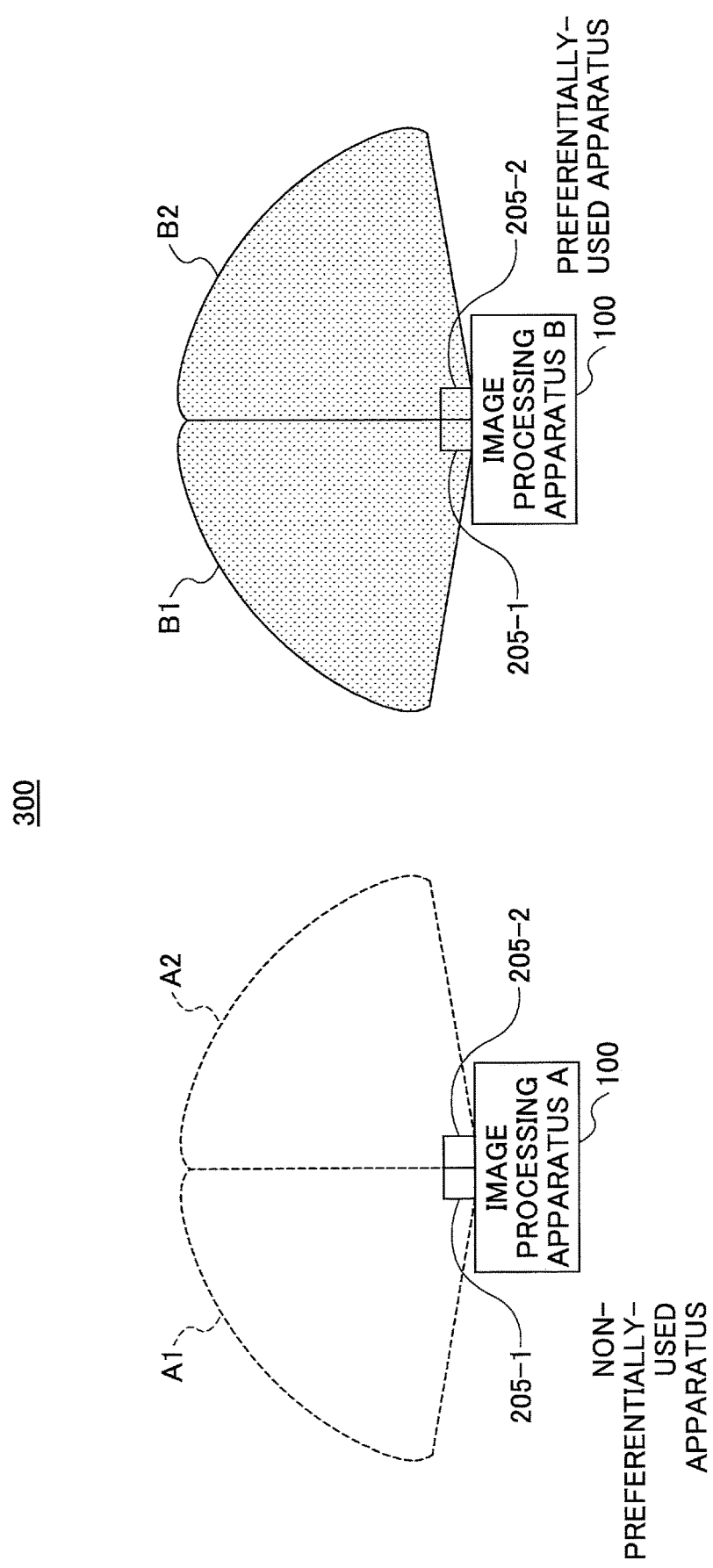

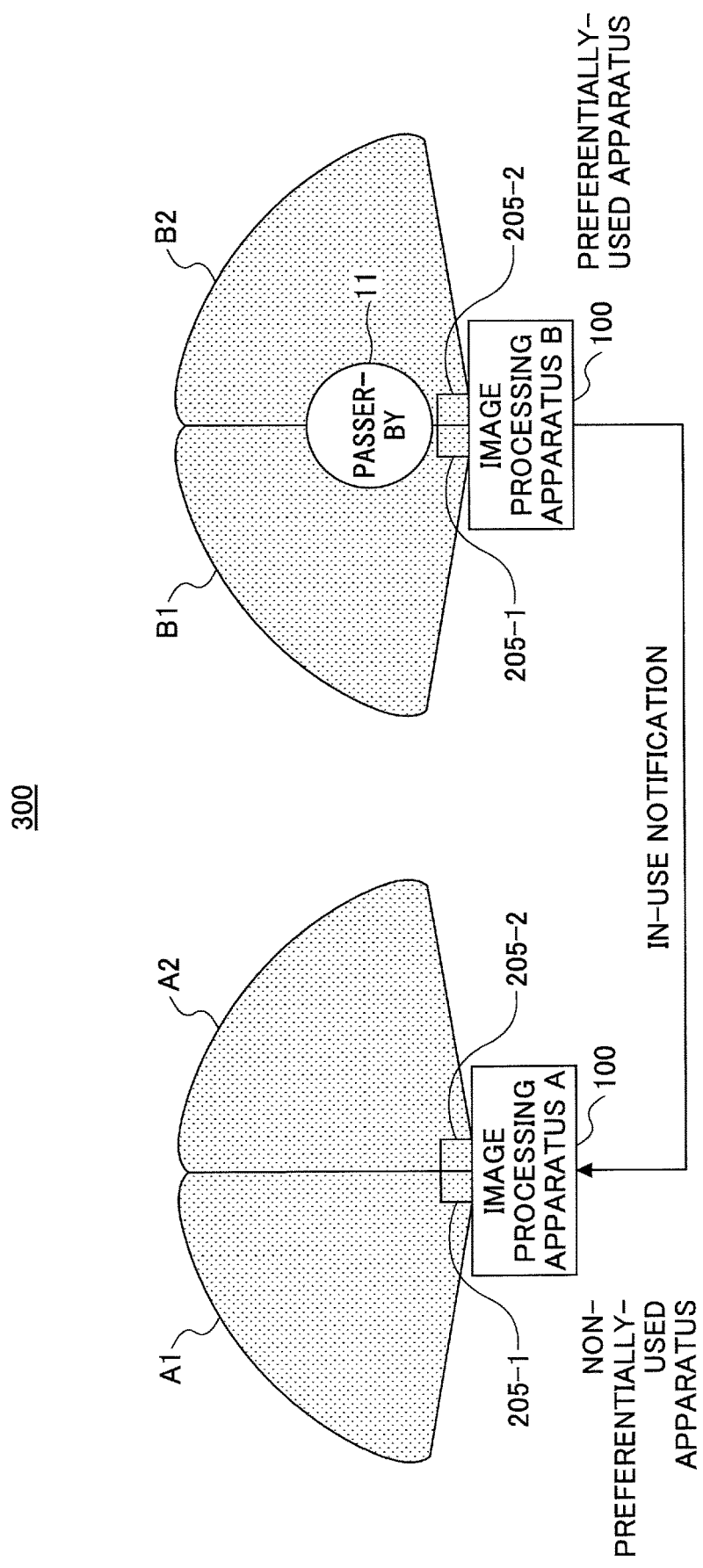

FIG.13
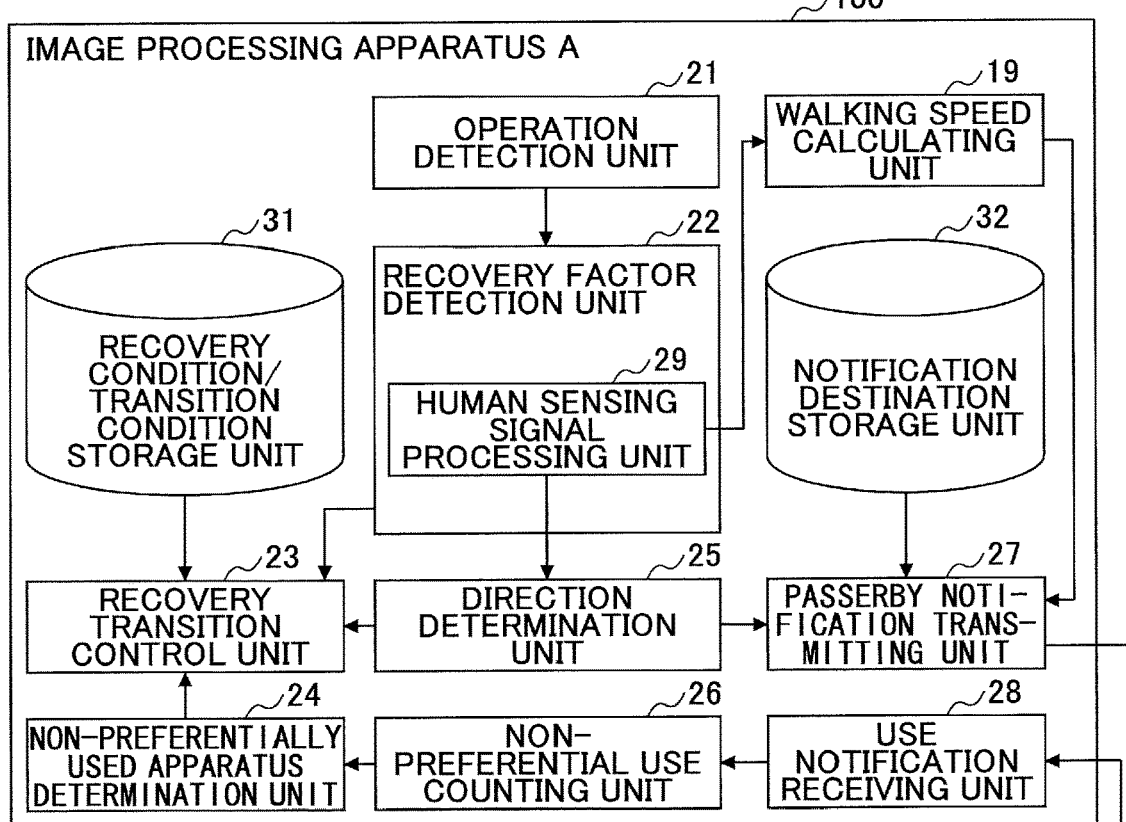
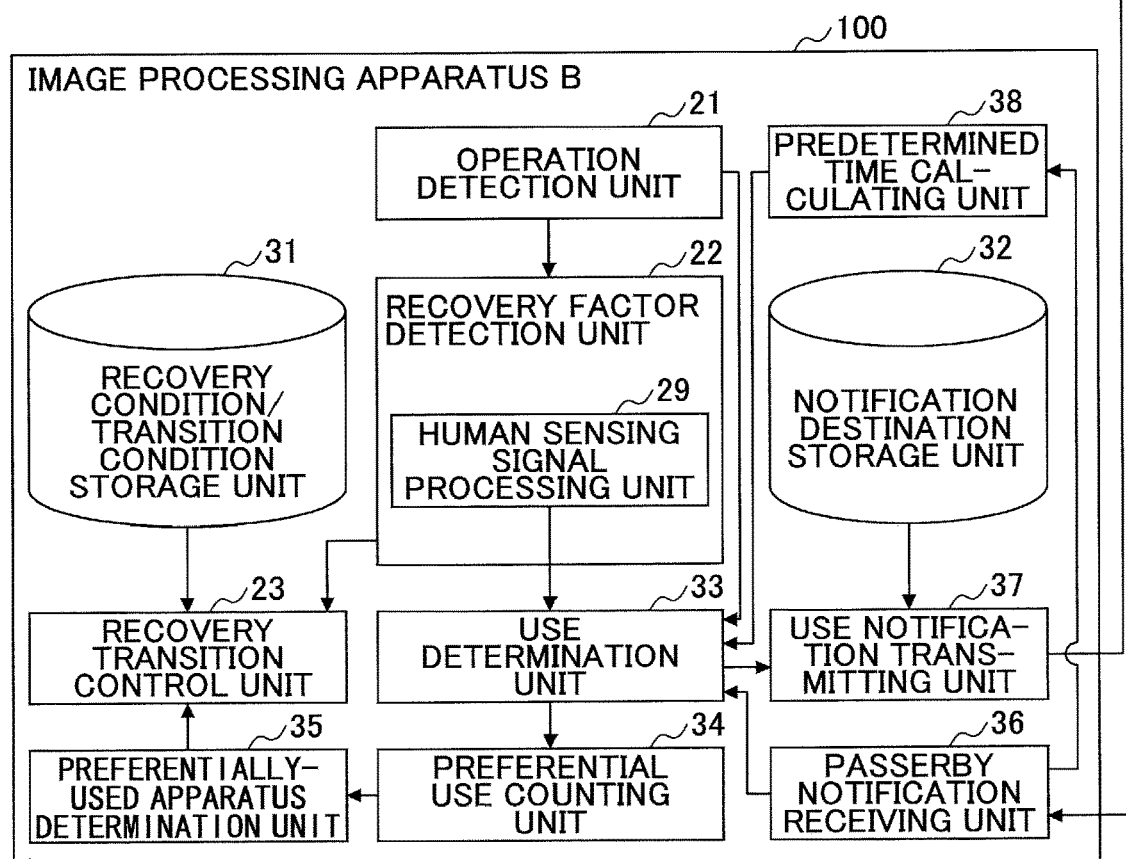

INFORMATION PROCESSING APPARATUS CONFIGURED TO CHANGE A CONTROL RELATED TO POWER CONSUMPTION

CROSS-REFERENCE TO RELATED APPLICATIONS

The present application claims priority under 35 U.S.C. § 119 to Japanese Patent Application No. 2017-049846 filed on Mar. 15, 2017, the entire contents of which are incorporated herein by reference.

BACKGROUND OF THE INVENTION

1. Field of the Invention

The present invention relates to an information processing apparatus.

2. Description of the Related Art

Image processing apparatuses, such as printers and multifunction peripherals, having human body detection sensors are known. An image processing apparatus having a human body detection sensor starts a recovery process for recovering from energy-saving mode to normal mode upon detecting an approaching user. In this way, power consumption may be reduced while the image processing apparatus is not being used, and at the same time, a waiting time before the user id able to use the image processing apparatus may be reduced.

Such an image processing apparatus may potentially waste energy by starting a recovery process in response to detecting a person that does not actually use the image processing apparatus (hereinafter referred to as a passerby that passes the vicinity of the image processing apparatus), for example. In this respect, techniques for preventing such undesired detection are known. For example, Japanese Patent No. 5300451 describes an image processing apparatus that can learn from the detection history of a human body detection sensor and the usage history of the image processing apparatus and automatically adjust the detection range (distance and angle) of the human body detection sensor.

However, techniques are not known for reducing power consumption and reducing the waiting time in a system including a plurality of image processing apparatuses. When a plurality of image processing apparatuses are provided, some of the image processing apparatuses may be preferentially used (hereinafter referred to as "preferentially-used apparatus") and some of the image processing apparatuses may not be preferentially used (hereinafter referred to as "non-preferentially-used apparatus"). Although preferentially-used apparatuses are more frequently used than non-preferentially-used apparatuses, the preferentially-used apparatuses and the non-preferentially-used apparatuses are typically not distinguished from one another. As such, it has been difficult for the image processing apparatuses to control power consumption and reduce the waiting time in a well-balanced manner.

SUMMARY OF THE INVENTION

One aspect of the present invention is directed to providing an information processing apparatus that has improved capabilities for reducing power consumption and the waiting time.

According to one embodiment of the present invention, an information processing apparatus is provided that is capable of communicating with another information processing apparatus. The information processing apparatus includes a detection device and a processor that is configured to execute processes of detecting a passerby passing a detection range of the detection device that is formed in at least a part of a region surrounding the information processing apparatus; transmitting to the other information processing apparatus, a passerby notification indicating that the detected passerby is approaching the other information processing apparatus; receiving from the other information processing apparatus, a use notification indicating that the other information processing apparatus has been used; determining that the information processing apparatus has not been preferentially used upon receiving the use notification from the other information processing apparatus; and changing a control related to power consumption of the information processing apparatus depending on whether the processor has determined that the information processing apparatus has not been preferentially used.

BRIEF DESCRIPTION OF THE DRAWINGS

FIG. 4 is a diagram illustrating an example functional configuration of the image processing apparatus;

FIGS. 7A and 7B are diagrams illustrating energy-saving control for a preferentially-used apparatus and a non-preferentially-used apparatus;

FIG. 13 is a diagram illustrating an example functional configuration of the image processing system that is capable of taking into account the walking speed of the passerby.

DESCRIPTION OF THE EMBODIMENTS

In the following, embodiments of the present invention are described with reference to the accompanying drawings.

First Embodiment

<Image Processing Apparatus Overall Operation>

Figure 1:
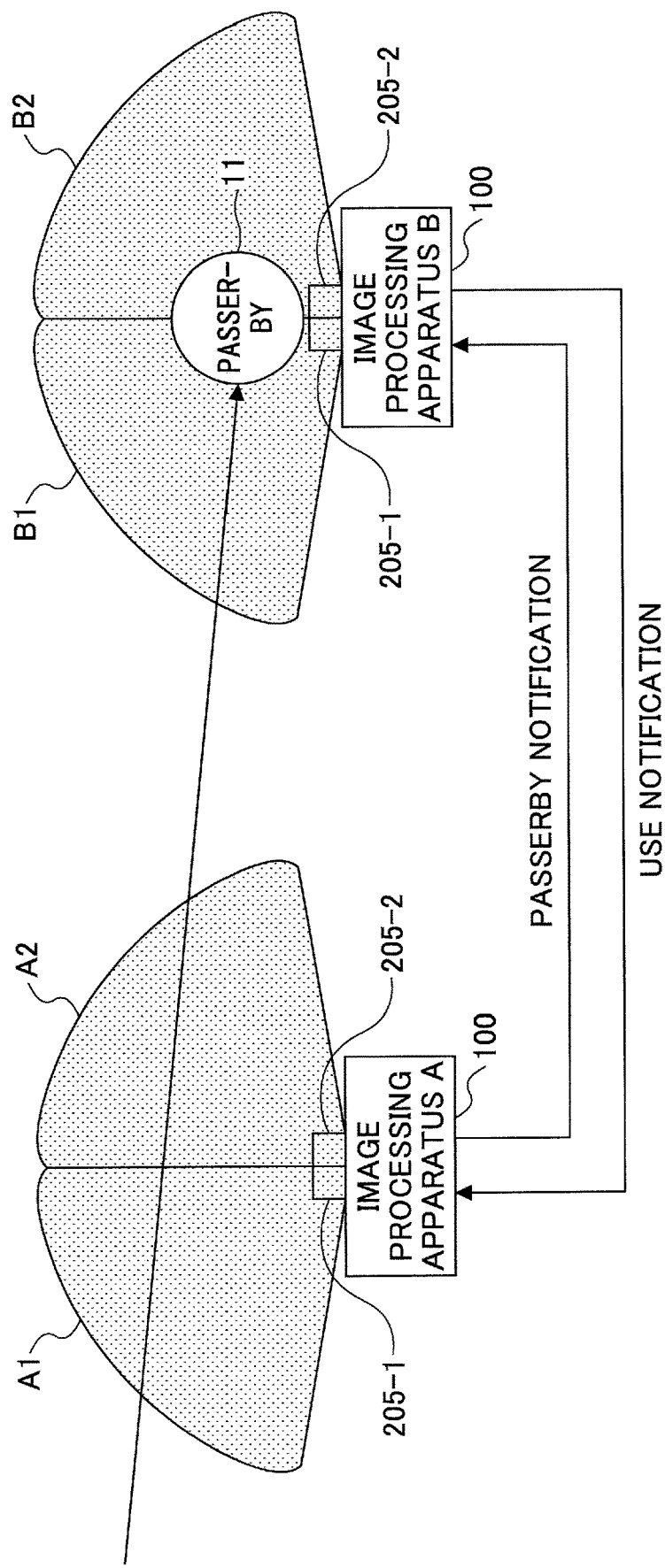
FIG. 1 is a diagram illustrating a detection range of a human body detection sensor of an image processing apparatus and a determination of whether the image processing apparatus is a preferentially-used apparatus or a non-preferentially-used apparatus according to an embodiment of the present invention.

In the following, an overall operation of an image processing apparatus according to an embodiment of the present invention will be described with reference to FIG. 1. FIG. 1 is a diagram illustrating a detection range of a human body detection sensor 205 of an image processing apparatus 100 and a determination of whether the image processing apparatus 100 is a preferentially-used apparatus or a non-preferentially-used apparatus according to an embodiment of the present invention.

The image processing apparatus 100 (referred to as "image processing apparatus A" and "image processing apparatus B" when a plurality of image processing apparatuses 100 are to be distinguished from one another) includes a plurality of human body detection sensors 205-1 to 205-n, where "n" represents an integer greater than one (simply referred to as "human body detection sensor 205" when the plurality of human body detection sensors are not to be distinguished from one another). Each of the human body detection sensors 205 forms its detection range for detecting the presence of a human body (see e.g., detection ranges A1 and A2 of the image processing apparatus A, detection ranges B1 and B2 of the image processing apparatus B in FIG. 1). The detection range is formed in at least a part of a region surrounding the image processing apparatus 100. Note that the number of human body detection sensors 205 to be simultaneously activated by the image processing apparatus 100 is not limited to a particular number as long as two or more human body detection sensors 205 are activated.

Also, the detection ranges formed by the human body detection sensors 205 may overlap. Further, properties such as the size and direction of the detection range may be set up in the image processing apparatus 100 by an administrator of the image processing apparatus 100, for example. Alternatively, the image processing apparatus 100 may automatically set up properties such as the size and direction of the detection range based on the detection history of the human body detection sensors 205, the operation history of users, and the like, for example.

The image processing apparatus 100 may first determine whether or not it has been preferentially used (whether it corresponds to a preferentially-used apparatus or a non-preferentially-used apparatus) in the following manner, for example.

(1) At least two human body detection sensors 205-1 and 205-2 of the image processing apparatus A detect a human body at different times while the image processing apparatus A is not operated. However, an operation on the image processing apparatus A is not detected within a certain time after the human body detection sensors 205 detect the present of the human body, and as a result, the image processing apparatus A determines that the detected human body is a passerby 11.

(2) The image processing apparatus A estimates the direction in which the passerby 11 is travelling based on the order in which the human body detection sensors 205-1 and 205-2 of the image processing apparatus A have detected the passerby 11.

(3) The image processing apparatus A transmits a notification (passerby notification) indicating that the passerby 11 is approaching the image processing apparatus B that is located in the travelling direction of the passerby 11.

(4) When the image processing apparatus B is used within a predetermined time after the image processing apparatus B receives the passerby notification, it is determined that the image processing apparatus B has been preferentially used and the process of determining a preferentially-used apparatus and a non-preferentially-used apparatus may be performed as described below, for example.

Upon determining that the image processing apparatus B has been preferentially used, the image processing apparatus B increments the number of times it has been preferentially used (preferential use count number) by one. When the preferential use count number of the image processing apparatus B becomes greater than or equal to a threshold value, the image processing apparatus B determines that it is a preferentially-used apparatus.

Also, the image processing apparatus B transmits a notification (use notification) to the image processing apparatus A indicating that the image processing apparatus B has been used. As a result, the image processing apparatus A can determine that it has not been preferentially used, and in response, the image processing apparatus A increments the number of times it has not been preferentially used (non-preferential use count number) by one. When the non-preferential use count number of the image processing apparatus A becomes greater than or equal to a threshold value, the image processing apparatus A determines that it corresponds to a non-preferentially-used apparatus.

Based on the determinations of whether the image processing apparatuses A and B correspond to a preferentially-used apparatus or a non-preferentially-used apparatus, the image processing apparatuses A and B can appropriately control the power supplies of the human body detection sensors 205. In this way, an appropriate balance may be achieved between reducing power consumption and reducing the waiting time in a system including a plurality of image processing apparatuses 100.

Terminology

The term "passerby" refers to a person detected by the image processing apparatus 100. The passerby detected by the image processing apparatus 100 may use the image processing apparatus 100 or may not use the image processing apparatus 100 (including cases where the passerby is presumed to not use the image processing apparatus 100). That is, the passerby may merely be a detected person or a person that uses the image processing apparatus 100 (more appropriately referred to as a user). In the following description of the present embodiment, a passerby, a detected person, and a user are indiscriminately referred to as "passerby". Whether a passerby corresponds to a detected person or a user can be determined from the context.

The term "approaching" may be broadly used to refer to instances in which there is a possibility that a passerby is approaching regardless of whether the passerby is actually approaching. Also, the term "used" refers to an instance in which a function of the image processing apparatus 100 is used; more specifically, an instance in which some operation is performed on the image processing apparatus 100.

The term "preferentially" is used to refer to an instance in which one of a plurality of image processing apparatuses 100 is used and the other is not used. Although recognition of a passerby and specific setting of preferential use or non-preferential use are not necessary, such setting may be made.

<System Configuration>

Figure 2:
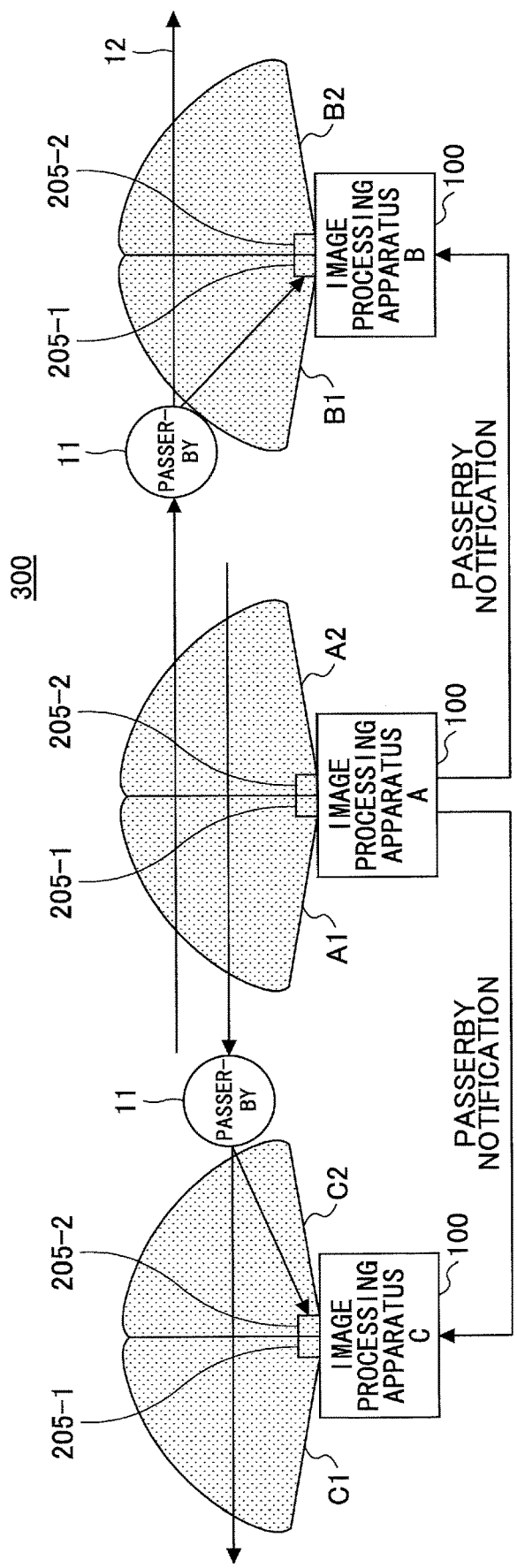
FIG. 2 is a diagram illustrating an example configuration of an image processing system.

FIG. 2 is a diagram illustrating an example configuration of an image processing system 300 according to an embodiment of the present invention. The image processing system 300 according to the present embodiment includes at least two image processing apparatuses 100. Note that although three image processing apparatuses 100 are illustrated in FIG. 2, the image processing system 300 may include four or more image processing apparatuses 100, for example.

The image processing apparatus 100 is a device having functions of at least one of a printer, a scanner, a copier, and a fax machine. Also, in addition to the above functions, the image processing apparatus 100 has functions of an information processing apparatus (computer). Preferably, the image processing apparatus 100 has functions of a printer for forming an image and printing the image on a print medium such as paper. Further, the image processing apparatus 100 may be referred to as an MFP (Multi-Functional Peripheral) or an image forming apparatus.

Note that the image processing apparatuses A, B, and C do not necessarily have to be installed side by side on a straight line as illustrated in FIG. 2. Also, the front sides of the image processing apparatuses A and B do not have to be facing the same direction, and the front sides of the image processing apparatuses A and C do not have to be facing the same direction. In this case, the detection ranges A1, A2, B1, B2, C1, and C2 may be appropriately set up so that the travelling direction of the passerby 11 can be detected. Thus, the image processing apparatuses A and B are arranged close enough so that the passerby 11 that has passed the detection ranges of the image processing apparatus A can be detected as being likely to pass the detection ranges of the image processing apparatus B. That is, the image processing apparatuses A and B may be arranged to be within a predetermined distance from each other.

As can be appreciated from the above, an image processing apparatus 100 that detects a passerby 11 transmits a passerby notification indicating that a passerby is approaching to an adjacent image processing apparatus 100 that is located in the travelling direction of the passerby. Additionally, in a case where three or more image processing apparatuses 100 are arranged next to one another, an image processing apparatus 100 that detects a passerby may transmit a passerby notification indicating that a passerby is approaching to two or more image processing apparatuses 100 that are located in the travelling direction of the passerby. For example, the image processing apparatus C of FIG. 2 may transmit a passerby notification indicating that the passerby 11 is approaching to the image processing apparatuses A and B.

In following descriptions of the present embodiment, for the sake of convenience, instances in which the image processing apparatus A determines the travelling direction of the passerby 11 and transmits a passerby notification to the image processing apparatus B or C are described as examples.

<Hardware Configuration>

Figure 3:
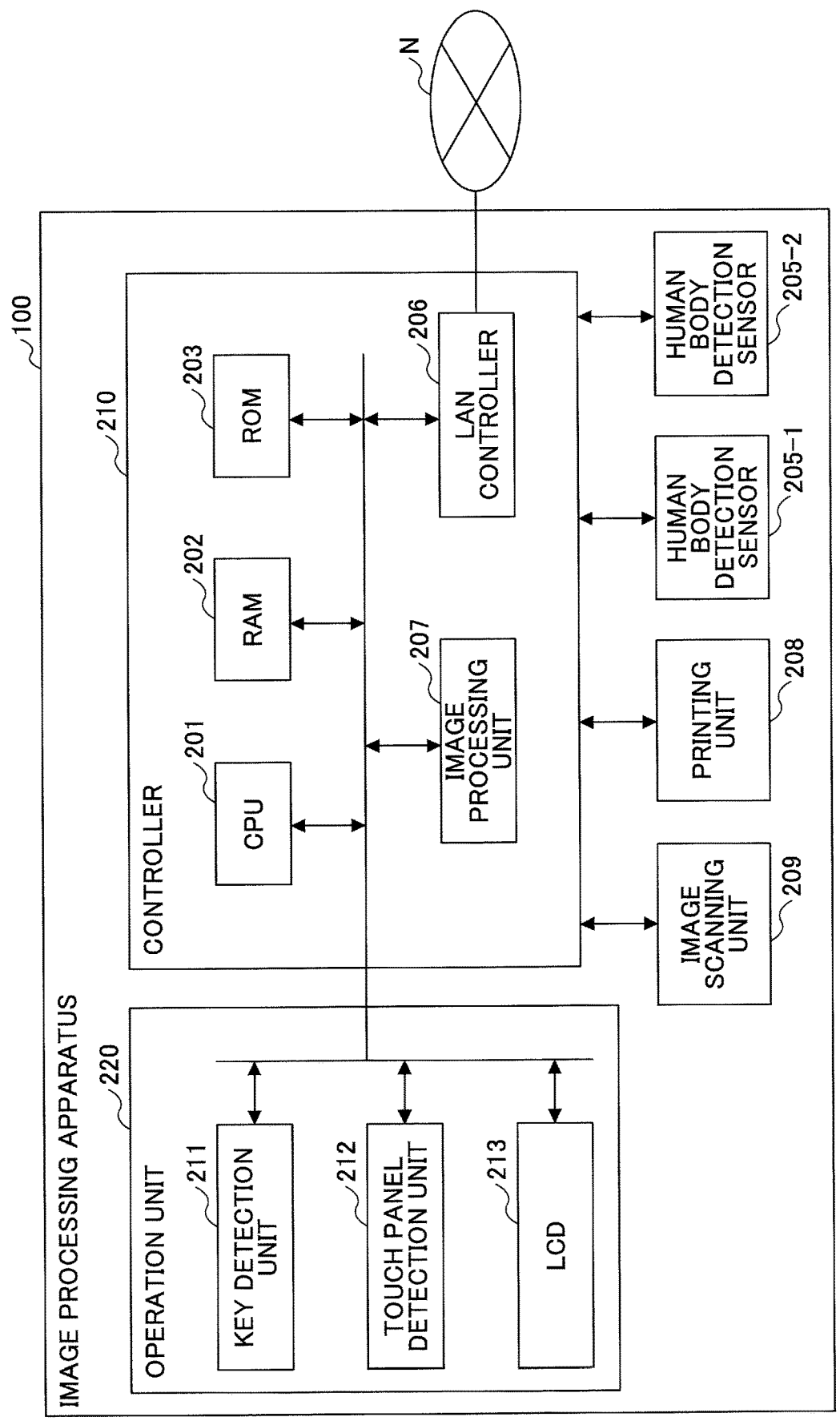
FIG. 3 is a diagram illustrating an example hardware configuration of the image processing apparatus.

In the following, the hardware configuration of the image processing apparatus 100 according to the present embodiment will be described. FIG. 3 is a diagram illustrating an example hardware configuration of the image processing apparatus 100 according to the present embodiment.

In FIG. 3, the image processing apparatus 100 includes a controller 210, an operation unit 220, an image scanning unit 209, a printing unit 208, and human body detection sensors 205-1 and 205-2.

The controller 210 includes a CPU (Central Processing Unit) 201, a RAM (Random Access Memory) 202, a ROM (Read-Only Memory) 203, an image processing unit 207, and a LAN (Local Area Network) controller 206.

The CPU 201 performs computations and control for executing processes of the image processing apparatus 100. For example, the CPU 201 executes various programs. Note that in some embodiments, the CPU 201 may be configured by a plurality of CPUs and/or devices, or a plurality of cores in order to increase the speed through parallel processing, for example.

Upon receiving a notification from the human body detection sensors 205-1 and 205-2 that a passerby has been detected, the CPU 201 starts a recovery process for recovering from energy-saving mode to normal mode in cooperation with the image scanning unit 209 and the printing unit 208.

Note that energy-saving mode refers to an operation mode (second operation mode) in which power consumption is reduced by restricting use of some functions of the image processing apparatus 100 when the user is not using the image processing apparatus 100. Note that in some embodiments, a plurality of different energy-saving modes that reduce power consumption at varying degrees may be available, for example. On the other hand, an operation mode that does not restrict power consumption may be referred to as a normal mode (first operation mode). In normal mode, the image processing apparatus 100 can perform image forming operations such as printing.

The RAM 202 and the ROM 203 are examples of a storage device. The ROM 203 may store programs to be executed by the CPU 201, data, and/or parameters, for example. When the CPU 201 executes a program, the RAM 202 may store the program being executed, data used by the program, data generated by the program, and parameters, for example. The image processing apparatus 100 may also include an auxiliary storage device such as a hard disk, for example.

The LAN controller 206 is a network I/F (interface), such as Ethernet (registered trademark), for example, and is connected to a network such as a LAN so that the image processing apparatus 100 can communicate with another image processing apparatus 100. The LAN controller 206 may be a USB I/F or the like that connects the image processing apparatus 100 to a network on a one-to-one basis, for example. The LAN controller 206 may also be a device communicating wirelessly such as a wireless LAN or Bluetooth (registered trademark), for example.

The image processing unit 207 is an IC chip configured by an ASIC or the like that performs various types of image processing operations. For example, the image processing unit 207 may perform conversion of print data to image data, image area separation, color conversion, γ conversion, and the like. Further, the image processing unit 207 may perform pseudo halftone processing, such as dither processing and error diffusion processing, to convert multi-gradation image data into screen data represented by the presence or absence of pixels (1 or 0).

The human body detection sensor 205 forms a detection range corresponding to a range within which a human body can be detected. The human body corresponds to a person (human body, human being) that can use the image processing apparatus 100. In response to an instruction from the CPU 201, the human body detection sensor 205 can change the size of the detection range and the location of the detection range, for example. By using a plurality of human body detection sensors 205, the CPU 201 can determine the direction in which a passerby has travelled upon passing the image processing apparatus 100.

The human body detection sensor 205 may be configured by an infrared sensor (pyroelectric sensor), a sonic sensor, a temperature sensor, a radar, a camera, a sensor detecting changes in electrostatic capacitance, or a combination of one or more of the above, for example. Also, in a case where the passerby carries an IC card or a mobile terminal, a communication module of the image processing apparatus 100 that can communicate with a communication module (e.g., IC card, WiFi, Bluetooth (registered trademark), Zigbee (registered trademark)) of the IC card or the mobile terminal may be used as the human body detection sensor 205, for example. Among the above-described examples of the human body detection sensor 205, an infrared sensor may be suitably used to detect a person at a relatively low cost. The human body detection sensor 205 notifies the CPU 201 when a human body is detected.

The image scanning unit 209 is used to provide the functions of a scanner in the image processing apparatus 100. The image scanning unit 209 executes a scanning process in response to an instruction from the controller 210.

The printing unit 208 is used to provide a printing function in the image processing apparatus 100. The printing unit 208 executes a printing process in response to an instruction from the controller 210. Printed matter may be printed by the printing unit 208 using either the electrophotographic method or the inkjet method, for example.

The operation unit 220 receives an instruction directed to the image processing apparatus 100 from the user and notifies the CPU 201 of the specific content of the instruction. The operation unit 220 may include hard keys and soft keys formed on a touch panel, for example. The operation unit 220 includes a key detection unit 211 that primarily detects pressing of the hard keys. The operation unit 220 also includes a touch panel detection unit 212 that detects pressing of the touch panel including the soft keys. Also, in some embodiments, the image processing apparatus 100 may enable operation by voice input, for example. The operation unit 220 further includes a liquid crystal display (LCD) 213 corresponding to a display device that may be used to display a menu screen so that a user using the image processing apparatus 100 can set up printing conditions, scanning conditions, and the like, for example. The CPU 201 executes control operations corresponding to the instruction directed to the image processing apparatus 100 that has been received via the operation unit 220. The CPU 201 may also determine whether a passerby 11 has used the image processing apparatus 100 or has simply passed the image processing apparatus 100 based on whether the operation unit 220 has been used, for example. Alternatively, the CPU 201 may determine whether a passerby 11 has used the image processing apparatus 100 based on whether a document has been set to the image scanning unit 209, for example.

<Functional Configuration>

FIG. 4 is a block diagram illustrating an example functional configuration of the image processing apparatus 100. Note that although the image processing apparatuses A and B have substantially identical functions, in FIG. 4, the image processing apparatuses A and B are separately illustrated for the sake of convenience of explanation.

<<Image Processing Apparatus A>>

The image processing apparatus A includes an operation detection unit 21, a recovery factor detection unit 22, a recovery transition control unit 23, a non-preferentially-used apparatus determination unit 24, a direction determination unit 25, a non-preferential use counting unit 26, a passerby notification transmitting unit 27, and a use notification receiving unit 28. The above functional units of the image processing apparatus A may be implemented by the CPU 201 of FIG. 3 executing one or more programs loaded from the ROM 203 into the RAM 202 to control one or more of the hardware elements of the image processing apparatus 100 illustrated in FIG. 3, for example.

The image processing apparatus A also includes a recovery condition/transition condition storage unit 31 and a notification destination storage unit 32, which may be configured by the RAM 202 and/or the ROM 203 of FIG. 3, for example. The recovery condition/transition condition storage unit 31 stores a recovery condition and a transition condition. Note that the detection of a recovery factor by the recovery factor detection unit 22 is registered as a recovery condition in the recovery condition/transition condition storage unit 31. As for the transition condition, for example, a condition that a timer setting time elapses after an operation by the image processing apparatus 100 in normal mode is completed, or a condition that the timer setting time elapses without the image processing apparatus 100 being used (with the image processing apparatus 100 remaining idle) may be registered in the recovery condition/transition condition storage unit 31. The timer setting time is an example of a transition time and refers to a time period that is to elapse before the image processing apparatus 100 transitions from normal mode to energy-saving mode (time during which no operation is detected).

TABLE 1

| Direction | Notification Destination | IP Address | MAC Address |
|---|---|---|---|
| Right | Image Processing Apparatus B | 192.168.01.01 | 04-A3-43-5F-43-23 |
| Left | Image Processing Apparatus C | 192.168.01.02 | 04-A3-43-5F-23-52 |

The above Table 1 is an example of a notification destination information table that schematically represents notification destination information stored in the notification destination storage unit 32 in the form of a table. The notification destination information includes a notification destination, an IP address, and a MAC address registered in association with each direction (right direction and left direction) in which the passerby 11 may be travelling. Based on the direction in which the passerby 11 is travelling, the image processing apparatus 100 can refer to the notification destination storage unit 32 and determine the image processing apparatus 100 to which a passerby notification is to be transmitted.

Note that the administrator of the image processing apparatus 100 can set up the notification destination information in the notification destination information table as illustrated in Table 1 using the operation unit 220, for example.

(Functions)

The operation detection unit 21 detects user operations on the image processing apparatus A. For example, the operation detection unit 21 may detect the pressing of a hard key, the pressing of a soft key, the opening/closing of a document cover, the setting of a sheet on a manual feed tray, and the like. Such user operations correspond to recovery factors. The operation detection unit 21 may be implemented by the CPU 201 of FIG. 3 executing a program to control the operation unit 220, for example.

The recovery factor detection unit 22 detects recovery factors based on operations on the operation detection unit 21. The recovery factor detection unit 22 also detects other various recovery factors occurring in the image processing apparatus A. Examples of recovery factors other than operations on the operation unit 21 may include the following:

- The LAN controller 206 receiving a print job, for example.
- A USB memory being connected to a USB I/F, for example.
- The human body detection sensor 205 detecting a passerby 11.

The recovery factor detection unit 22 may be implemented by the CPU 201 of FIG. 3 executing a program to control the human body detection sensor 205 and the LAN controller 206, for example.

In addition, the recovery factor detection unit 22 includes a human sensing signal processing unit 29. The human sensing signal processing unit 29 determines whether a detection target (passerby 11) has been detected in each of the detection ranges A1 and A2. The human sensing signal processing unit 29 continues to determine that a passerby 11 is present while the passerby 11 is in the detection range A1, and the human sensing signal processing unit 29 continues to determine that the passerby 11 is present while the passerby 11 is in the detection range A2. Note that while the image processing apparatus 100 is used, the passerby 11 is simultaneously detected in both the detection ranges A1 and A2. When the passerby 11 passes the detection ranges A1 and A2 (without using the image processing apparatus 100), the human sensing signal processing unit 29 detects the passerby 11 in the detection ranges A1 and A2 with a time difference (i.e., at different times).

The direction determination unit 25 determines the direction in which the passerby 11 is travelling based on the determinations of whether the passerby 11 has been detected in the detection ranges A1 and A2 made by the human sensing signal processing unit 29. Specifically, when the following conditions (a) and (b) are satisfied, the direction determination unit 25 determines that a detected human body is a passerby 11 passing the image processing apparatus A.

(a) The passerby is detected in the detection ranges A1 and A2 with a time difference. The time difference may correspond to the approximate time it takes for the passerby to move from one end to the other end of the detection range A1 at walking speed.

(b) An operation on the operation unit 220 is not detected within a certain time after the passerby is detected in the detection range A1 or A2.

Note that while the operation unit 220 is being operated, the direction determination unit 25 does not detect the direction of a passerby. This is because while the operation unit 220 is being operated, the human body detection sensor 205 detects the person that is using the operation unit 220, and as such, it is difficult to detect the direction of a passerby at the same time.

The direction determination unit 25 determines the direction in which the passerby 11 is travelling based on whether the passerby 11 was first detected in the detection range A1 or the detection range A2 (i.e., which one of the human body detection sensors 205-1 or 205-2 was the first to detect the passerby 11). Assuming that the detection range A1 is located on the left side of the image processing apparatus A and the detection range A2 is located on the right side of the image processing apparatus A, when the passerby 11 is first detected in the detection range A1 and then detected in the detection range A2, it is determined that the passerby 11 is travelling from left to right. When the passerby 11 is first detected in the detection range A2 and then detected in the detection range A1, it is determined that the passerby 11 is travelling from right to left.

When the direction determination unit 25 determines that the passerby 11 is passing the image processing apparatus A, the passerby notification transmitting unit 27 refers to the notification destination storage unit 32 to determine the image processing apparatus 100 to which a passerby notification is to be transmitted based on the travelling direction of the passerby 11 and transmits the passerby notification indicating that the passerby 11 is approaching the relevant image processing apparatus 100. The passerby notification transmitting unit 27 may be implemented by the CPU 201 of FIG. 3 executing a program to control the LAN controller 206, for example.

The use notification receiving unit 28 receives a use notification from the image processing apparatus B. The use notification receiving unit 28 may be implemented by the CPU 201 of FIG. 3 executing a program to control the LAN controller 206, for example.

The non-preferential use counting unit 26 increments the number of times the image processing apparatus A was not preferentially used (non-preferential use count number) by one upon receiving a use notification from the image processing apparatus B. The use notification is transmitted from the image processing apparatus B that has received the passerby notification from the image processing apparatus A, and in this way, the image processing apparatus A can determine that the image processing apparatus B has been preferentially used over the image processing apparatus A.

When the non-preferential use count number reaches or exceeds a threshold value, the non-preferentially-used apparatus determination unit 24 determines that the image processing apparatus A is a non-preferentially-used apparatus. The non-preferentially-used apparatus determination unit 24 may be implemented by the CPU 201 of FIG. 3 executing a program, for example.

The recovery transition control unit 23 monitors whether a recovery condition stored in the recovery condition/transition condition storage unit 31 is satisfied based on notifications of recovery factors detected by the recovery factor detection unit 22 and controls recovery of the image processing apparatus A from energy-saving mode to normal mode. Also, the recovery transition control unit 23 monitors whether a transition condition stored in the recovery condition/transition condition storage unit 31 is satisfied and controls transition of the image processing apparatus A from normal mode to energy-saving mode. The recovery transition control unit 23 may be implemented by the CPU 201 of FIG. 3 executing a program, for example.

<<Image Processing Apparatus B>>

In the following, functions primarily implemented by the image processing apparatus B will be described. Note that in order to avoid redundancy of descriptions, functions of the image processing apparatus B that may be substantially identical to the functions of the image processing apparatus A will not be described below. The image processing apparatus B includes a use determination unit 33, a preferential-use counting unit 34, a preferentially-used apparatus determination unit 35, a passerby notification receiving unit 36, and a use notification transmitting unit 37. The above functional units of the image processing apparatus B may be implemented by the CPU 201 of FIG. 3 executing one or more-programs loaded from the RAM 202 to the ROM 203 to control one or more of the hardware elements of the image processing apparatus B illustrated in FIG. 3, for example.

The passerby notification receiving unit 36 receives a passerby notification from the image processing apparatus A. The passerby notification receiving unit 36 may be implemented by the CPU 201 of FIG. 3 executing a program to control the LAN controller 206, for example.

When the operation detection unit 21 detects an operation on the image processing apparatus B within a predetermined time after the passerby notification receiving unit 36 acquires a passerby notification, the use determination unit 33 determines that the passerby 11 that has been detected and determined to be a passerby by the image processing apparatus A has used the image processing apparatus B. The use determination unit 33 causes the use notification transmitting unit 37 to transmit a use notification to the image processing apparatus A and outputs to the preferential-use counting unit 34, an indication that the image processing apparatus B has been preferentially used. In a preferred embodiment, the use determination unit 33 may use the detection results of the human sensing signal processing unit 29 to take into account whether the direction of the passerby 11 corresponds to the direction of the image processing apparatus A.

Note that in the above description, "within a predetermined time" refers to detecting an operation within a time period from when the predetermined time elapses after a passerby notification is acquired until a margin time elapses. If preferential use of the image processing apparatus B is determined simply based on whether an operation is detected within the predetermined time, use by a user unrelated to the acquired passerby notification may potentially be erroneously detected as preferential use of the image processing apparatus B. The margin time takes account of variations and errors in the time it takes for the passerby 11 to reach the image processing apparatus B. The predetermined time may be set up in advance in view of the distance between the image processing apparatuses A and B, for example. The margin time may be about several seconds, for example.

In response to an instruction from the use determination unit 33 (issued when the operation detection unit 21 detects an operation on the image processing apparatus B within a predetermined time after receiving the passerby notification), the use notification transmitting unit 37 transmits a use notification to the image processing apparatus A (the image processing apparatus 100 that has transmitted the passerby notification to the image processing apparatus B). The use notification transmitting unit 37 may be implemented by the CPU 201 of FIG. 3 executing a program to control the LAN controller 206, for example.

The preferential use counting unit 34 receives an output indicating that the image processing apparatus B has been preferentially used from the use determination unit 33 and increments the preferential use count number by one. Because the image processing apparatus B was used by the passerby 11 after passing the image processing apparatus A, it can be determined that the image processing apparatus B was preferentially used over the image processing apparatus A.

When the preferential use count number becomes greater than or equal to a threshold value, the preferentially-used apparatus determination unit 35 determines that the image processing apparatus B is a preferentially-used apparatus. The preferentially-used apparatus determination unit 35 may be implemented by the CPU 201 of FIG. 3 executing a program, for example.

<Operations>

<<Non-Preferentially-Used Apparatus Determination>>

Figure 5:
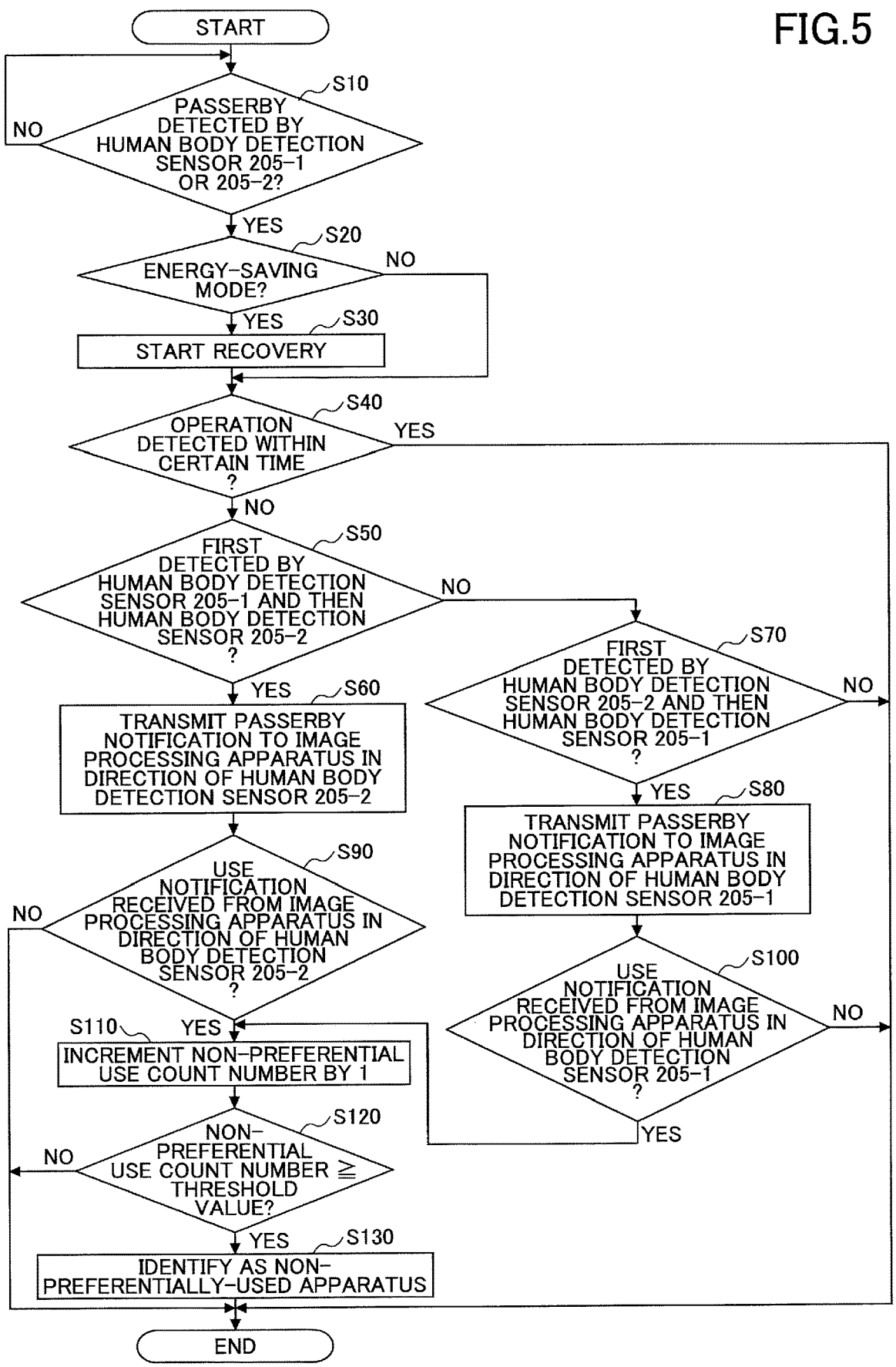
FIG. 5 is a flowchart illustrating an example process in which the image processing apparatus detects a passerby and determines whether it corresponds to a non-preferentially-used apparatus.

FIG. 5 is a flowchart illustrating a process in which the image processing apparatus A detects a passerby 11 and determines whether it is a non-preferentially-used apparatus.

In step S10, the human sensing signal processing unit 29 determines whether the human body detection sensor 205-1 or 205-2 has detected a passerby 11. Note that in the present example, the process proceeds to step S20 when at least one of the human body detection sensors 205-1 and 205-2 detects a passerby 11.

If a positive determination (YES) is made in step S10, the recovery transition control unit 23 determines whether the image processing apparatus A is in energy-saving mode (step S20).

If a positive determination (YES) is made in step S20, because a human body has been detected and the image processing apparatus B has to return to normal mode, the recovery transition control unit 23 starts a recovery process for recovering from energy-saving mode to normal mode (step S30).

Then, the operation detection unit 21 determines whether an operation on the image processing apparatus A has been detected within a certain time after the human body detection sensor 205-1 or 205-2 has detected the passerby 11 (step S40). The certain time may be determined in view of the distance from the edge of the detection range of the human body detection sensor 205-1 or 205-2 to the image processing apparatus A and the walking speed of the passerby 11, for example.

If a positive determination (YES) is made in step S40, this means that the passerby 11 used the image processing apparatus A (rather than passing the detection ranges A1 and A2 of the image processing apparatus A), and as such, a determination of whether the image processing apparatus A is a non-preferentially-used apparatus does not have to be made. Thus, the process of FIG. 5 is ended.

On the other hand, if a negative determination (NO) is made in step S40, the direction determination unit 25 determines whether the human body detection sensor 205-1 detected the passerby 11 before the human body detecting sensor 205-2 detected the passerby 11 in order to determine the travelling direction of the passerby 11 (step S50).

If a positive determination (YES) is made in step S50, the direction determination unit 25 refers to the notification destination storage unit 32 and determines that the passerby 11 is travelling towards the image processing apparatus B in the direction of the human body detection sensor 205-2, and the passerby notification transmitting unit 27 transmits a passerby notification to the image processing apparatus B (step S60).

On the other hand, if a negative determination (NO) is made in step S50, the direction determination unit 25 determines whether the human body detection sensor 205-2 detected the passerby 11 before the human body detection sensor 205-1 detected the passerby 11 in order to determine the travelling direction of the passerby 11 (step S70). Note that the above determination is made because the passerby 11 may be travelling in any direction.

If a positive determination (YES) is made in step S70, the direction determination unit 25 refers to the notification destination storage unit 32 and determines that the passerby 11 is travelling toward the image processing apparatus C in the direction of the human body detection sensor 205-1, and the passerby notification transmitting unit 27 transmits a passerby notification to the image processing apparatus C (step S80).

After step S60, the use notification receiving unit 28 determines whether a use notification has been received from the image processing apparatus B to which the passerby notification has been transmitted (step S90).

Similarly, after step S80, the use notification receiving unit 28 determines whether a usage notification has been received from the image processing apparatus C to which the passerby notification has been transmitted (step S100).

If a negative determination (NO) is made in step S90 or S100, this means that the passerby 11 has not used the image processing apparatus B or C, and as such, the image processing apparatus A does not have to make a determination of whether it is a non-preferentially-used apparatus. Thus, the process of FIG. 5 is ended.

On the other hand, if a positive determination (YES) is made in step S90 or S100, the non-preferential use counting unit 26 increments the non-preferential use count number by one (step S110). That is, if a use notification is received in step S90 or S100, it can be determined that the image processing apparatus B or C has been preferentially used over the image processing apparatus A.

Then, the non-preferential use apparatus determination unit 24 determines whether the non-preferential use count number is greater than or equal to a threshold value (step S120). Note that although the threshold value can be set to one, the threshold value is preferably set to a value greater than one in order to take into account the possibility of an accidental case of erroneous determination, for example. Further, the threshold value may be a fixed value or may be set to a desired value by the user or the administrator, for example.

If a positive determination (YES) is made in step S120, it is determined that the image processing apparatus A is a non-preferentially-used apparatus (step S130).

As described above, when a use notification is received from the image processing apparatus B or C corresponding to the transmission destination of a passerby notification transmitted by the image processing apparatus A, it can be determined that the image processing apparatus B or C has been preferentially used over the image processing apparatus A and that the image processing apparatus A is a non-preferentially-used apparatus.

<<Preferentially-Used Apparatus Determination>>

Figure 6:
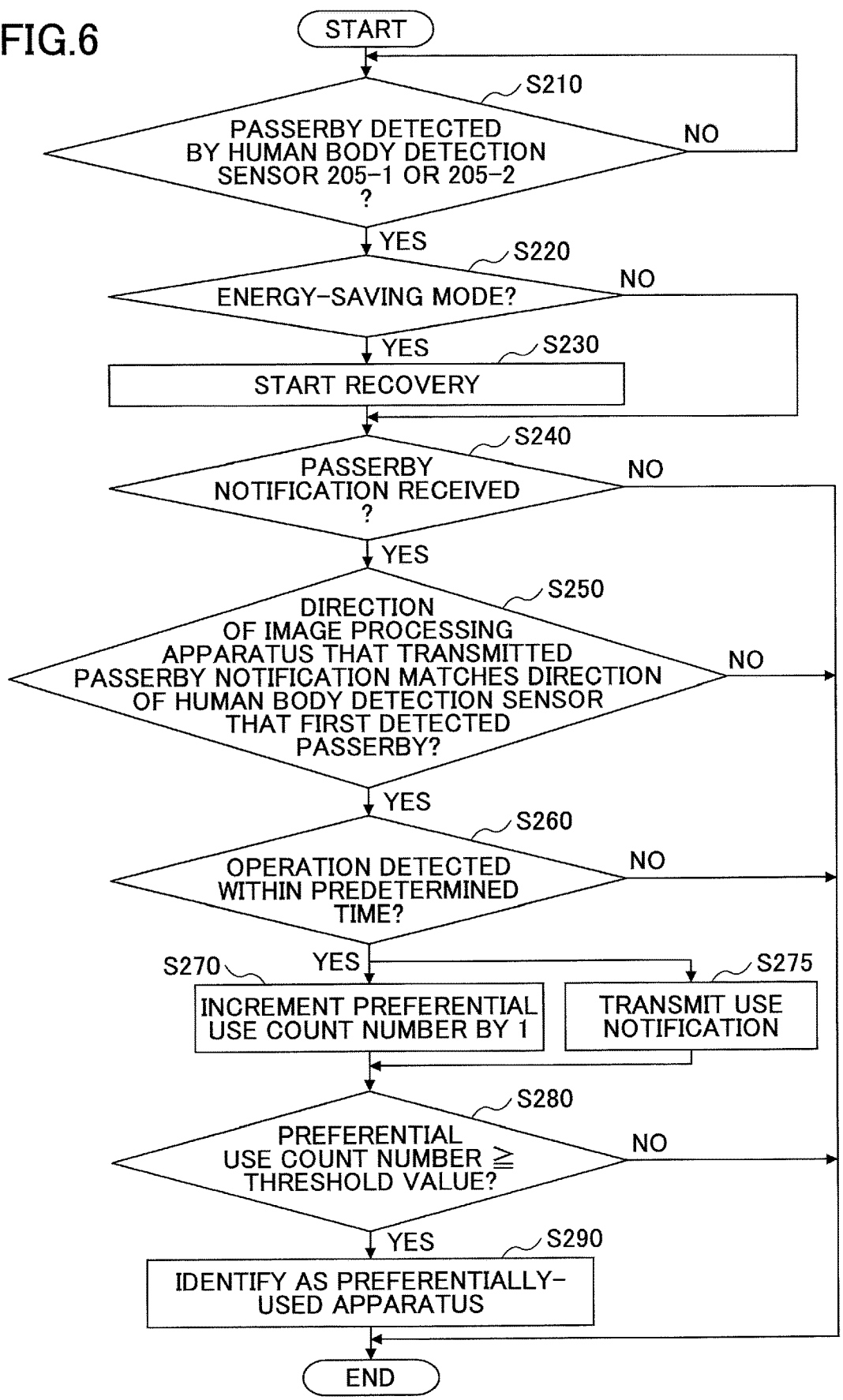
FIG. 6 is a flowchart illustrating an example process in which the image processing apparatus detects a passerby and determines whether it corresponds to a preferentially-used apparatus.

FIG. 6 is a flowchart illustrating a process in which the image processing apparatus B detects the passerby 11 and determines whether it is a preferentially-used apparatus. Note that process operations of steps S210 to S230 of FIG. 6 may be substantially identical to those of steps S10 to S30 of FIG. 5.

In step S240, the passerby notification receiving unit 36 determines whether it has received a passerby notification.

If a positive determination (YES) is made in step S240, the use determination unit 33 determines whether the direction of the image processing apparatus A that transmitted the passerby notification corresponds to the direction of the human body detection sensor 205-1 or 205-2 of the image processing apparatus B that first detected the passerby 11 (step S250). Note that each image processing apparatus 100 that can be a notification destination is registered in association with its direction in the notification destination information table (Table 1). Thus, if the IP address of the image processing apparatus 100 that transmitted the passerby notification is acquired, its direction can be determined based on the notification destination information table and a determination can be made as to whether the direction of the image processing apparatus 100 corresponds to the direction of the human body detection sensor 205-1 or 205-2 of the image processing apparatus B that first detected the passerby 11.

If a negative determination (NO) is made in step S250, this means that another passerby 11 that is unrelated to the passerby notification received in step S240 has been detected. As such, the process of FIG. 6 is ended.

If a positive determination (YES) is made in step S250, the use determination unit 33 determines whether an operation on the image processing apparatus B has been detected within a predetermined time after receiving the passerby notification (step S60).

If a negative determination (NO) is made in step S260, this means that the passerby 11 has not used the image processing apparatus B. In this case, a determination of whether the image processing apparatus B is a preferentially-used apparatus does not have to be made. Thus, the process of FIG. 6 is ended.

If a positive determination (YES) is made in step S260, it can be presumed that the passerby 11 passed the detection ranges A1 and A2 of the image processing apparatus A and operated the image processing apparatus B. Thus, the preferential use counting unit 34 increments the preferential use count number by one (step S270).

Also, the use notification transmitting unit 37 transmits a use notification to the image processing apparatus A (step S275).

Then, the preferentially-used apparatus determination unit 35 determines whether the preferential use count number is greater than or equal to a threshold value (step S280). Note that although the threshold value may be set to one, the threshold value is preferably set to a value greater than one in order to take into account the possibility of an accidental case of erroneous determination, for example. Further, the threshold value may be a fixed value or may be set to a desired value by the user or the administrator, for example.

If a positive determination (YES) is made in step S280, the preferentially-used apparatus determination unit 35 determines that the image processing apparatus B is a preferentially-used apparatus (step S290).

As described above, when a passerby 11 approaches the image processing apparatus B from the direction of the image processing apparatus A that has transmitted a passerby notification and operates the image processing apparatus B, it can be determined that the image processing apparatus B has been preferentially used over the image processing apparatus A and that the image processing apparatus B is a preferentially-used apparatus.

<Energy-Saving Control after Preferentially-Used Apparatus/Non-Preferentially-Used Apparatus Determination>

After the preferentially-used apparatus and the non-preferentially-used apparatus are identified by the above-described processes, the image processing apparatus 100 can implement energy saving control appropriate for a preferentially-used apparatus or energy saving control appropriate for a non-preferentially-used apparatus.

FIGS. 7A and 7B are diagrams illustrating examples of energy saving control for a preferentially-used apparatus and energy saving control for a non-preferentially-used apparatus. In the example of FIG. 7A, the image processing apparatus A on the left side is determined to be a non-preferentially-used apparatus and the image processing apparatus B on the right side is determined to be a preferentially-used apparatus. In this case, the image processing apparatus A corresponding to a non-preferentially-used apparatus transitions to energy-saving mode and turns off the power supply of the human body detection sensor 205. In this way, power consumption of the image processing apparatus A can be reduced.

Note that even when the power supply of the human body detection sensor 205 of an image processing apparatus 100 is turned off, a passerby 11 can still use the image processing apparatus 100 because the image processing apparatus 100 can return to normal mode when it detects an operation performed on the image processing apparatus 100 by the passerby 11. Note that in this case, because the human body detection sensor 205 cannot detect the passerby 11 approaching the image processing apparatus 100 and start a recovery process in advance, the waiting time before the passerby 11 can use the image processing apparatus 100 cannot be reduced. However, because a non-preferentially-used apparatus is presumably less frequently used than a preferentially-used apparatus, the advantageous effects of reducing power consumption by turning off the power supply of the human body detection sensor 205 outweigh the disadvantage of not being able to use the human body detection sensor 205 to reduce the waiting time.

Note that in a preferred embodiment, the non-preferentially-used apparatus turns off the power supply of the human body detection sensor 205 on condition that the preferentially-used apparatus is not being used. This is because when the preferentially-used apparatus is not used, the non-preferentially-used apparatus may be less likely to be used. Thus, even if the power supply of the human body detection sensor 205 of the non-preferentially-used apparatus is turned off, adverse effects resulting from not being able to use the human body detection sensor 205 to reduce the waiting time can be avoided or minimized. On the other hand, when the preferentially-used apparatus is used, there is a higher likelihood that the non-preferentially-used apparatus will also be used because the preferentially-used apparatus is not idle. If the power supply of the human body detection sensor 205 of the non-preferentially-used apparatus is turned off in such case, desired effects of reducing the waiting time by using the human body detection sensor 205 cannot be achieved.

In view of the above, in the example illustrated in FIG. 7B, when the preferentially-used apparatus is used while the power supply of the human body detection sensor 205 of the non-preferentially-used apparatus is turned off, the preferentially-used apparatus transmits to the non-preferentially-used apparatus, an in-use notification indicating that it is being used. Note that the in-use notification is transmitted from the preferentially-used apparatus (image processing apparatus B) to the non-preferentially-used apparatus (image processing apparatus A) to indicate that the preferentially-used apparatus is being used regardless of whether the passerby 11 is using the preferentially-used apparatus. In contrast, a use notification will only be is transmitted when the passerby 11 is using the preferentially-used apparatus.

Upon receiving the in-use notification, the non-preferentially-used apparatus determines that it may possibly be used and thereby turns on the power supply of the human body detection sensor 205. Note, however, that because the passerby 11 may not necessarily use the non-preferentially-used apparatus, the non-preferentially-used apparatus remains in energy-saving mode.

By turning on the power supply of the human detection sensor 205, the non-preferentially-used apparatus can detect the passerby 11 in its detection range and start a recovery process for recovering to normal mode, for example. In this way, the waiting time before the passerby 11 can use the non-preferentially-used apparatus can be reduced. By performing energy saving control as illustrated in FIGS. 7A and 7B, an appropriate balance may be achieved between reducing power consumption and reducing the waiting time.

Figure 8:
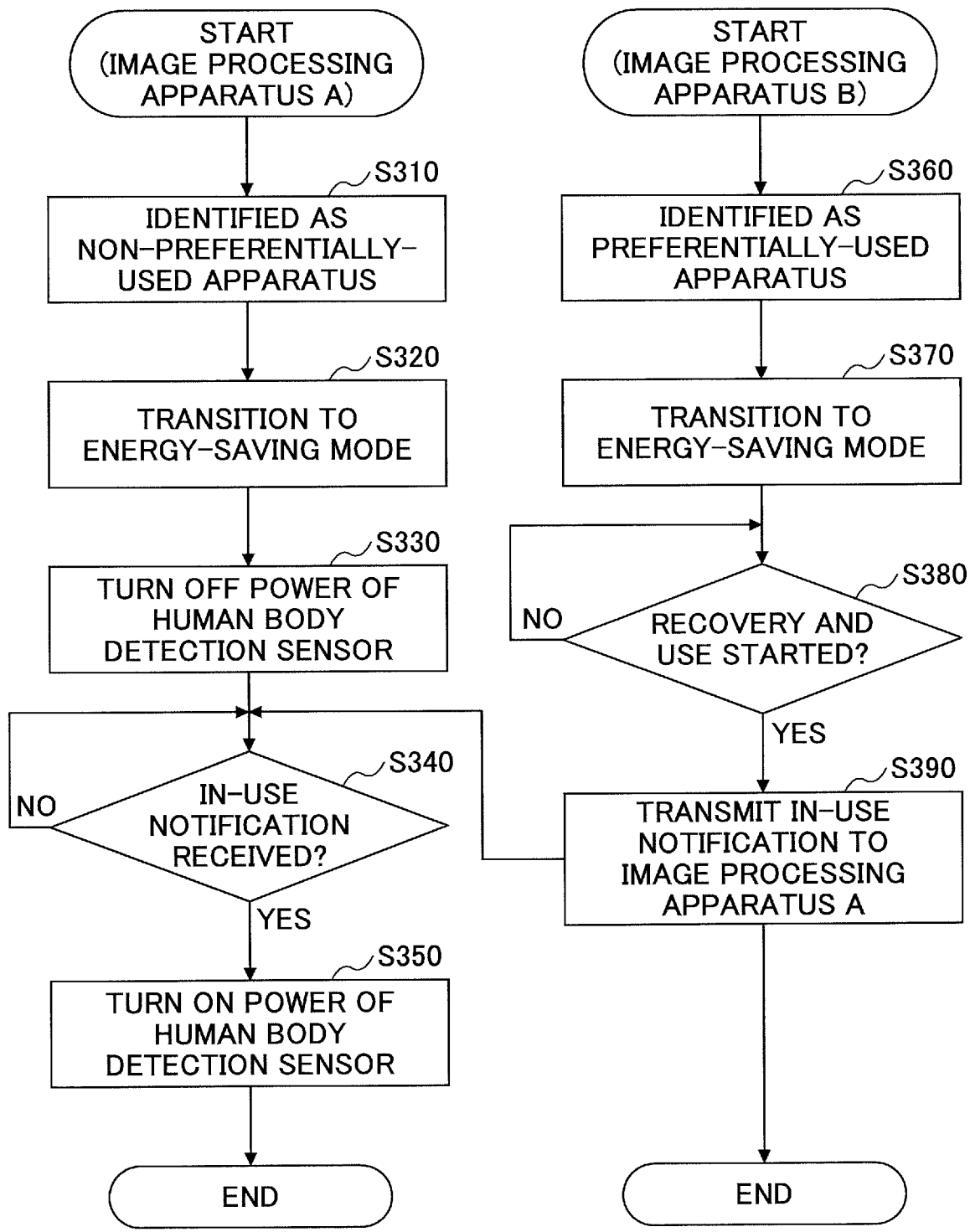
FIG. 8 is a flowchart illustrating an example process in which the image processing system controls the power supply of the human body detection sensor.

FIG. 8 is a flowchart illustrating an example process in which the image processing system 300 controls the power supply of the human body detection sensor 205. The process of FIG. 8 may be started when the image processing apparatuses A and B are identified as either a non-preferentially-used apparatus or a preferentially used apparatus, for example.

In step S310, the non-preferentially-used apparatus determination unit 24 of the image processing apparatus A determines that the image processing apparatus A is a non-preferentially-used apparatus.

Then, after the timer setting time elapses from the time the image processing apparatus A was last used, the recovery transition control unit 23 controls the image processing apparatus A to transition to energy-saving mode (step S320). In turn, the recovery transition control unit 23 of the image processing apparatus A turns off the power supply of the human body detection sensor 205 (step S330).

While the power supply of the human body detection sensor 205 is turned off in energy-saving mode, the use notification receiving unit 28 determines whether an in-use notification has been received (step S340). Note that the image processing apparatus 100 that transmits the in-use notification does not have to take into account the travelling direction of the passerby 11. For example, the image processing apparatus A can receive an in-use notification from an image processing apparatus 100 that is within a predetermined distance from the image processing apparatus A. Note that the in-use notification is transmitted from a preferentially-used apparatus.

If an in-use notification is received (YES in step S340), the recovery transition control unit 23 turns on the power supply of the human body detection sensor 205 (step S350).

On the other hand, the preferentially-used apparatus determination unit 35 of the image processing apparatus B determines that the image processing apparatus B is a preferentially-used apparatus (step S360).

Then, after the timer setting time elapses from the time the image processing apparatus B was last used, the recovery transition control unit 23 controls the image processing apparatus B to transition to energy-saving mode (step S370).

After transitioning to energy-saving mode, the recovery factor detection unit 22 of the image processing apparatus B determines whether a recovery factor has been detected. Because the image processing apparatus B may simply recover from energy-saving mode to normal mode in response to a detection by the human body detection sensor 205, a determination is made as to whether the image processing apparatus B has recovered to normal mode and whether the image processing apparatus B has actually started being used (step S380). For example, it may be determined whether the printing unit 208 or the image reading unit 209 has been operated. Note that use of the image processing apparatus 100 in the present embodiment is not limited to a case where a user directly operates the image processing apparatus 100.

When a positive determination (YES) is made in step S380, the use notification transmitting unit 37 transmits an in-use notification to the image processing apparatus A (step S390).

As described above, by identifying the non-preferentially-used apparatus and the preferentially-used apparatus in the image processing system 300 and turning off the power supply of the human body detection sensor 205 of the non-preferentially-used apparatus, an appropriate balance may be achieved between reducing power consumption and reducing the waiting time in implementing energy saving control with respect to the image processing apparatuses 100.

<Energy Saving Control Switching Between Preferentially-Used Apparatus and Non-Preferentially-Used Apparatus>

Figure 9:
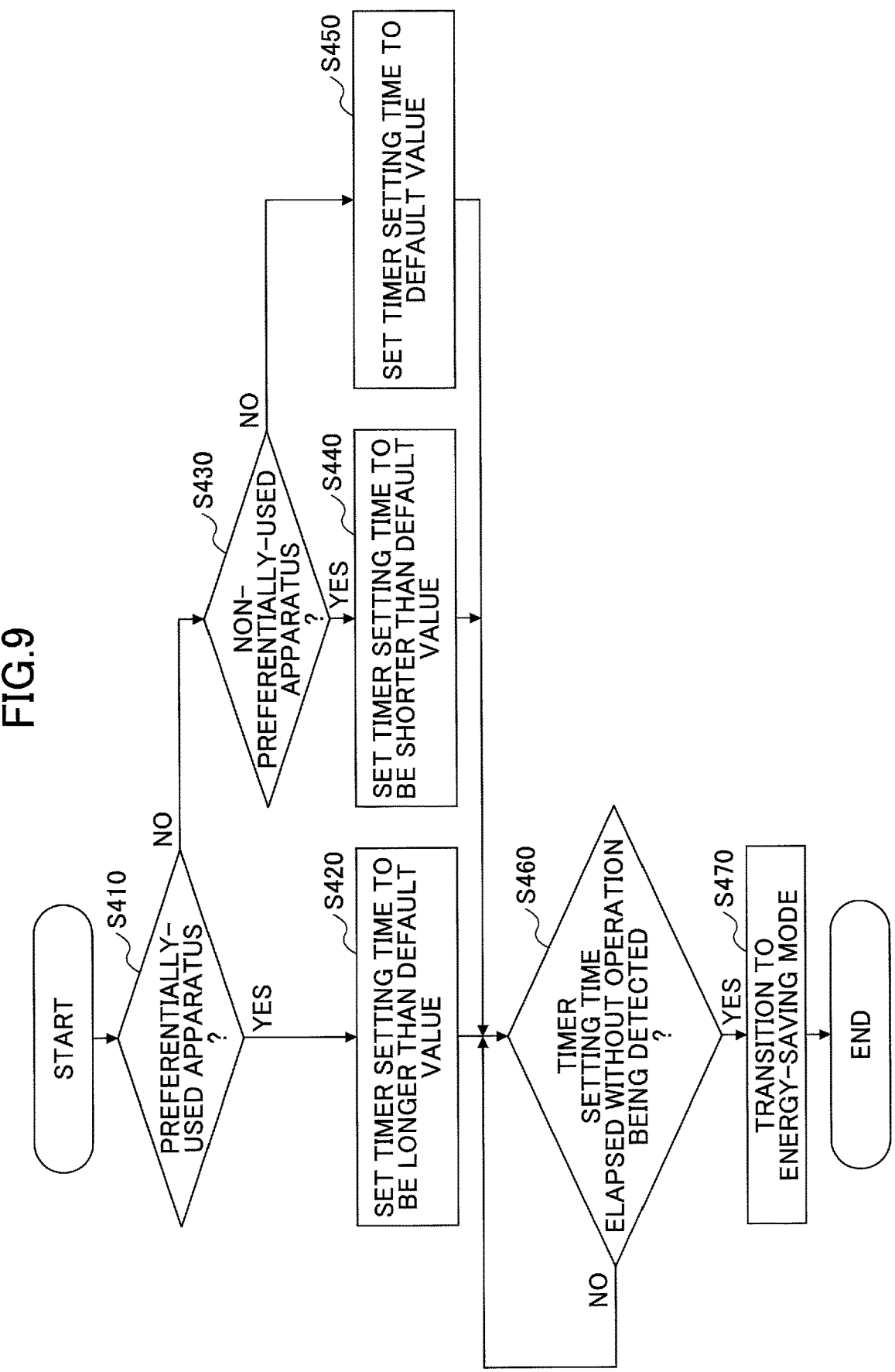
FIG. 9 is a flowchart illustrating an example process for switching transition control for transitioning to energy-saving mode depending on whether the image processing apparatus is a preferentially-used apparatus or a non-preferentially-used apparatus.

FIG. 9 is a flowchart illustrating an example process in which transition control to energy-saving mode is switched (changed) depending on whether the image processing apparatus 100 is a preferentially-used apparatus or a non-preferentially-used apparatus. The process of FIG. 9 may be started after the image processing apparatus 100 has been identified as a preferentially-used apparatus or a non-preferentially-used apparatus, in a state where the passerby 11 is no longer detected, for example.

In step S410, the recovery transition control unit 23 of the image processing apparatus 100 determines whether it is a preferentially-used apparatus.

If a positive determination (YES) is made in step S410, the recovery transition control unit 23 sets the timer setting time (time period that is to elapse before transitioning to energy-saving mode) to be longer than a default value (step S420). Such a measure is implemented because a preferentially-used apparatus has a higher probability of being used. By configuring the preferentially-used apparatus to remain in normal mode for a longer period of time, the risk of increasing the waiting time as a result of transitioning to energy-saving mode may be reduced. Also, a preferentially-used apparatus may be used immediately after a previous use is ended, and as such, the waiting time may be reduced by refraining from immediately turning off its power supply after use. Further, the number of times the preferentially-used apparatus undergoes a recovery process for recovering from energy-saving mode to normal mode may be reduced so that components such as the HDD that have constraints on the number of time they can be turned off/on may be protected.

If a negative determination (NO) is made in step S410, the recovery transition control unit 23 determines whether the image processing apparatus 100 is a non-preferentially-used apparatus (step S430).

If a positive determination (YES) is made in step S430, the recovery transition control unit 23 sets the timer setting time (time period that is to elapse before transitioning to energy-saving mode) to be shorter than the default value (step S440). Because a non-preferentially-used apparatus is less likely to be used, the non-preferentially-used apparatus is configured to transition to energy-saving mode at an earlier stage in order to reduce power consumption.

Note that in some preferred embodiments, the timer setting time that is to elapse before transitioning to energy saving mode may be set to a shorter time period only when the preferentially-used apparatus is not in use, for example. When the preferentially-used apparatus is in use, there is a higher possibility that the non-preferentially-used apparatus will also be used. Thus, by refraining from configuring the non-preferentially-used apparatus to transition to energy-saving mode at an earlier stage when the preferentially-used apparatus is in use, the risk of increasing the waiting time as a result of transitioning to energy-saving mode can be reduced.

If a negative determination (NO) is made in step S30, this means that the image processing apparatus 100 is neither a preferentially-used apparatus nor a non-preferentially-used apparatus. As such, the recovery transition control unit 23 does not change the timer setting time that is to elapse before transitioning to energy-saving mode such that the timer setting time remains set to the default value (step S450).

Then, the recovery transition control unit 23 determines whether a transition condition for transitioning to energy-saving mode has been satisfied (step S460). The transition condition for transitioning to energy-saving mode may be a condition that the timer setting time elapses after completion of an operation by the image processing apparatus 100 or a condition that the timer setting time elapses without the image processing apparatus 100 being used (with the image processing apparatus 100 remaining idle), for example.

If a positive determination (YES) is made in step S460, the recovery transition control unit 23 transitions from normal mode to energy-saving mode (S370). That is, the recovery transition control unit 23 controls power to be supplied to some functions but shuts off power supply to other functions of the image processing apparatus 100.

Note that in the example of FIG. 9, the timer setting time is made longer when the image processing apparatus 100 is determined to be a preferentially-used apparatus, and the timer setting time is made shorter when the image processing apparatus 100 is determined to be a non-preferentially-used apparatus. However, in some embodiments, only one of the above may be implemented, for example.

As described above, according to an aspect of the present embodiment, by determining whether the image processing apparatus 100 corresponds to a preferentially-used apparatus or a non-preferentially-used apparatus, appropriate power saving control for the preferentially-used apparatus or the non-preferentially-used apparatus may be implemented.

<Passerby Notification Restraint>

Although it is described above that the image processing apparatus A transmits a passerby notification to the image processing apparatus B, there are situations in which the image processing apparatus A preferably refrains from transmitting a passerby notification to the image processing apparatus B.

Figure 10:
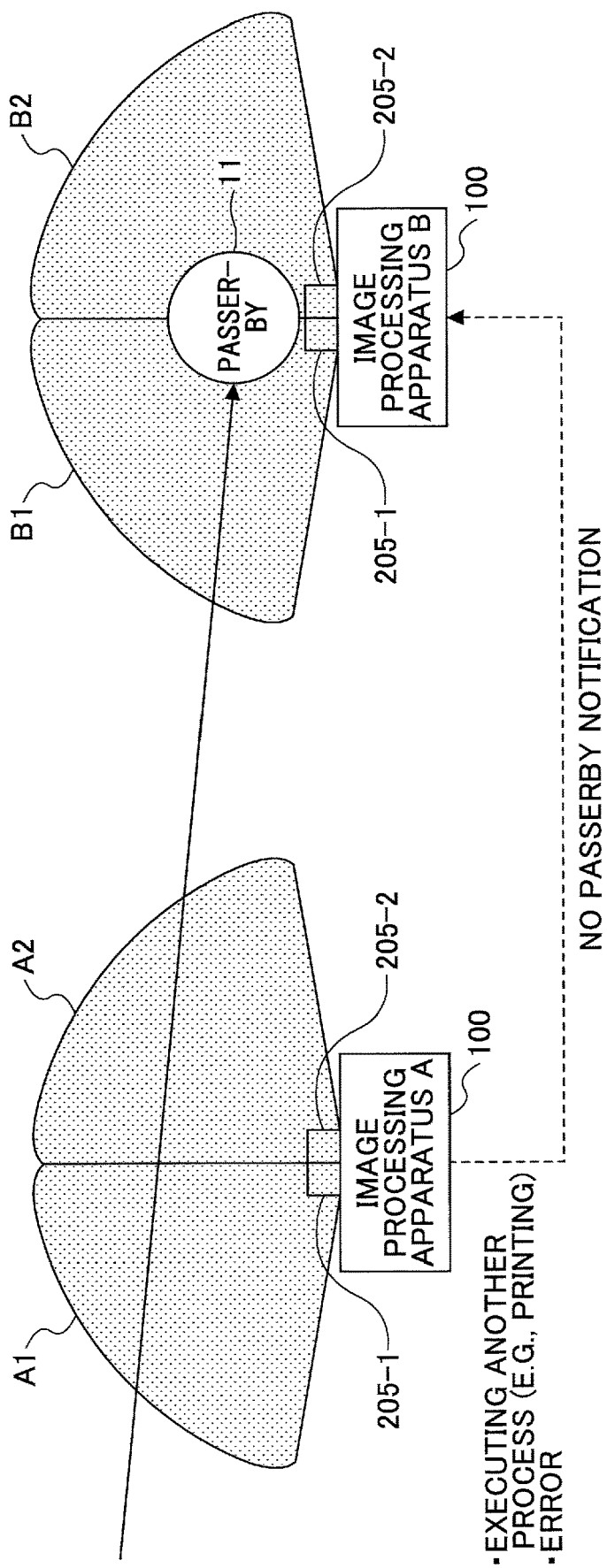
FIG. 10 is a diagram illustrating an example case in which a passerby notification is not transmitted.

FIG. 10 is a diagram describing an example situation in which a passerby notification is not transmitted. In FIG. 10, a passerby 11 passes the detection ranges A1 and A2 of the image processing apparatus A and operates the image processing apparatus B. Thus, the image processing apparatus A should transmit a passerby notification to the image processing apparatus B according to the above descriptions of the present embodiment.

However, in a situation where it is difficult for the passerby 11 to use the image processing apparatus A, it is natural for the passerby 11 to use the image processing apparatus B. In such a situation, determinations should not be made that the image processing apparatus A is a non-preferentially-used apparatus and the image processing apparatus B is a preferentially-used apparatus. Therefore, when the image processing apparatus A is in a state that makes it difficult for the passerby 11 to use the image processing apparatus A (e.g., the image processing apparatus A is currently performing another process or an error is occurring in the image processing apparatus A), even when the image processing apparatus A detects the passerby 11 but does not detect an operation performed thereon, the image processing apparatus A does not transmit a passerby notification to the image processing apparatus B.

Example states of the image processing apparatus A that would prevent the passerby 11 from using the image processing apparatus A include a state where another process, such as printing, is being executed by the image processing apparatus A (e.g., a print job or the like is received via a network) and a state where an error is occurring in the image processing apparatus A (also referred to as "non-usable state" hereinafter).

By controlling the image processing apparatus A to refrain from transmitting a passerby notification to the image processing apparatus B that is located in the travelling direction of the passerby 11 when the image processing apparatus A is in a non-usable state as described above, the image processing apparatus B may be prevented from erroneously determining whether the image processing apparatus B has been preferentially used. Also, the image processing apparatus A may be prevented from erroneously determining whether the image processing apparatus A has not been preferentially used.

Figure 11:
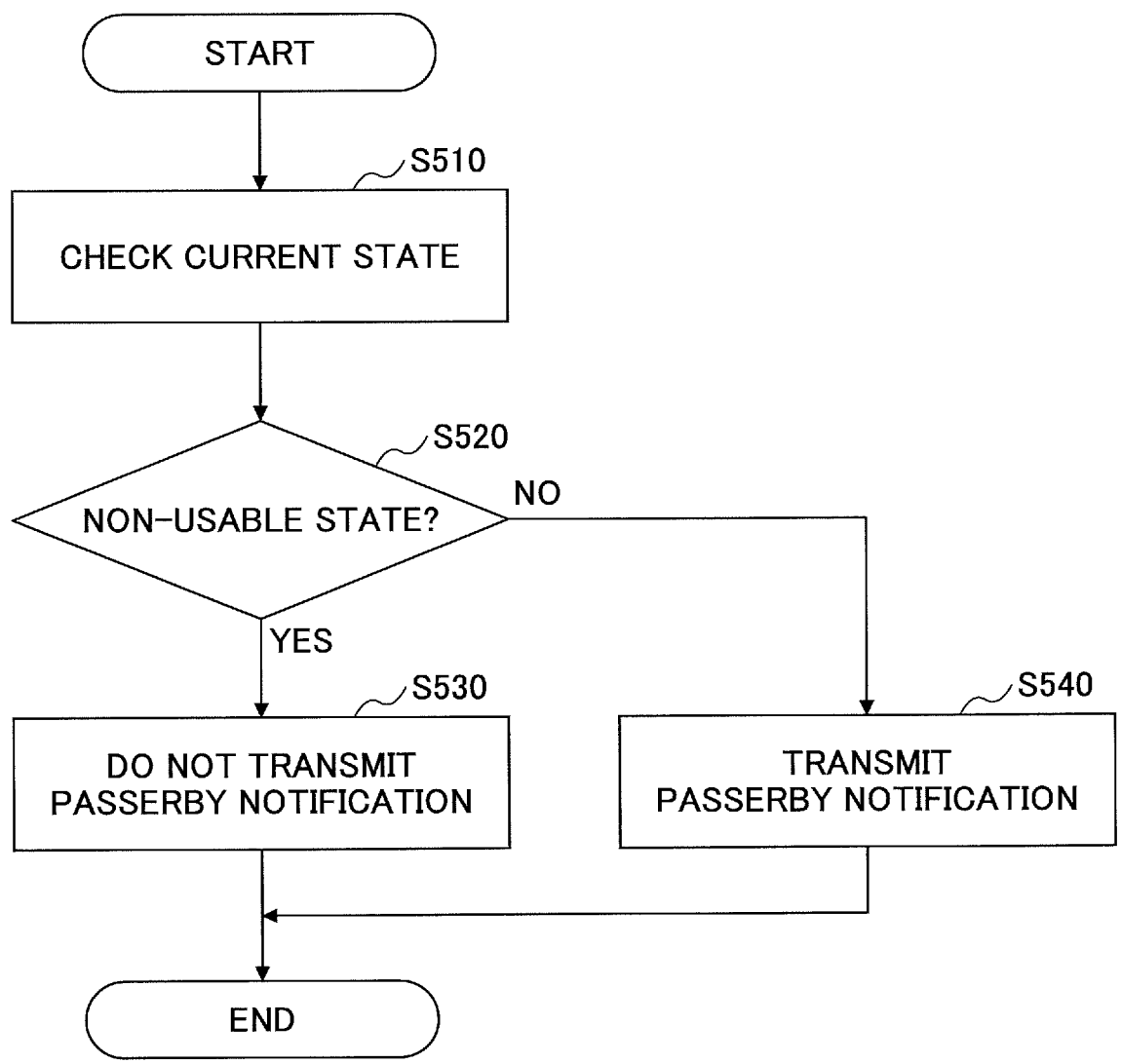
FIG. 11 is a flowchart illustrating an example process for determining whether a passerby notification transmitting unit is to transmit a passerby notification.

FIG. 11 is a flowchart illustrating an example process for determining whether the passerby notification transmitting unit 27 is to transmit a passerby notification. The process of FIG. 11 is executed when it is determined that the image processing apparatus 100 is to transmit a passerby notification.

In step S510, the passerby notification transmitting unit 27 checks the current state of the image processing apparatus 100 that is to transmit the passerby notification. That is, the passerby notification transmitting unit 27 determines whether the image processing apparatus 100 can be used by the passerby 11. Note that example non-usable states of the image processing apparatus 100 that would prevent the passerby 11 from using the image forming apparatus 100 include an error state and an executing state. The error state of the image processing apparatus 100 may be determined based on a status code indicating the occurrence of a paper jam or the open/closed state of a door, for example. The executing state in which the image processing apparatus 100 is executing another process, such as printing, may be determined based on the presence/absence of a print job, the operation status of the printing unit 208, or the operation status of the image scanning unit 209, for example.

Then, a determination is made as to whether the image processing apparatus 100 is in a non-usable state that would prevent use of the image processing apparatus 100 (step S520). If a positive determination (YES) is made in step S520, the passerby notification transmitting unit 27 does not transmit a passerby notification (step S530). If a negative determination (NO) is made in step S520, the passerby notification transmitting unit 27 transmits a passerby notification (step S540).

As described above, the image processing system 300 according to the present embodiment controls the power supply of the human body detection sensor 205 and controls the timer setting time that is to elapse before transitioning to energy-saving mode based on determinations of whether the image processing apparatuses A and B correspond to either a preferentially-used apparatus or a non-preferentially-used apparatus. In this way, an appropriate balance may be achieved between reducing power consumption and reducing the waiting time, for example.

Second Embodiment

In the following, an image processing apparatus 100 according to a second embodiment of the present invention will be described. Note that features of the second embodiment that may be substantially identical to those of the first embodiment are given the same reference numerals and overlapping descriptions thereof may be omitted. The image processing apparatus 100 according to the second embodiment is capable of taking into account a walking speed of a passerby to accurately determine a predetermined time that is to be used in determining whether an operation by the passerby has been detected within the predetermined time.

Figure 12:
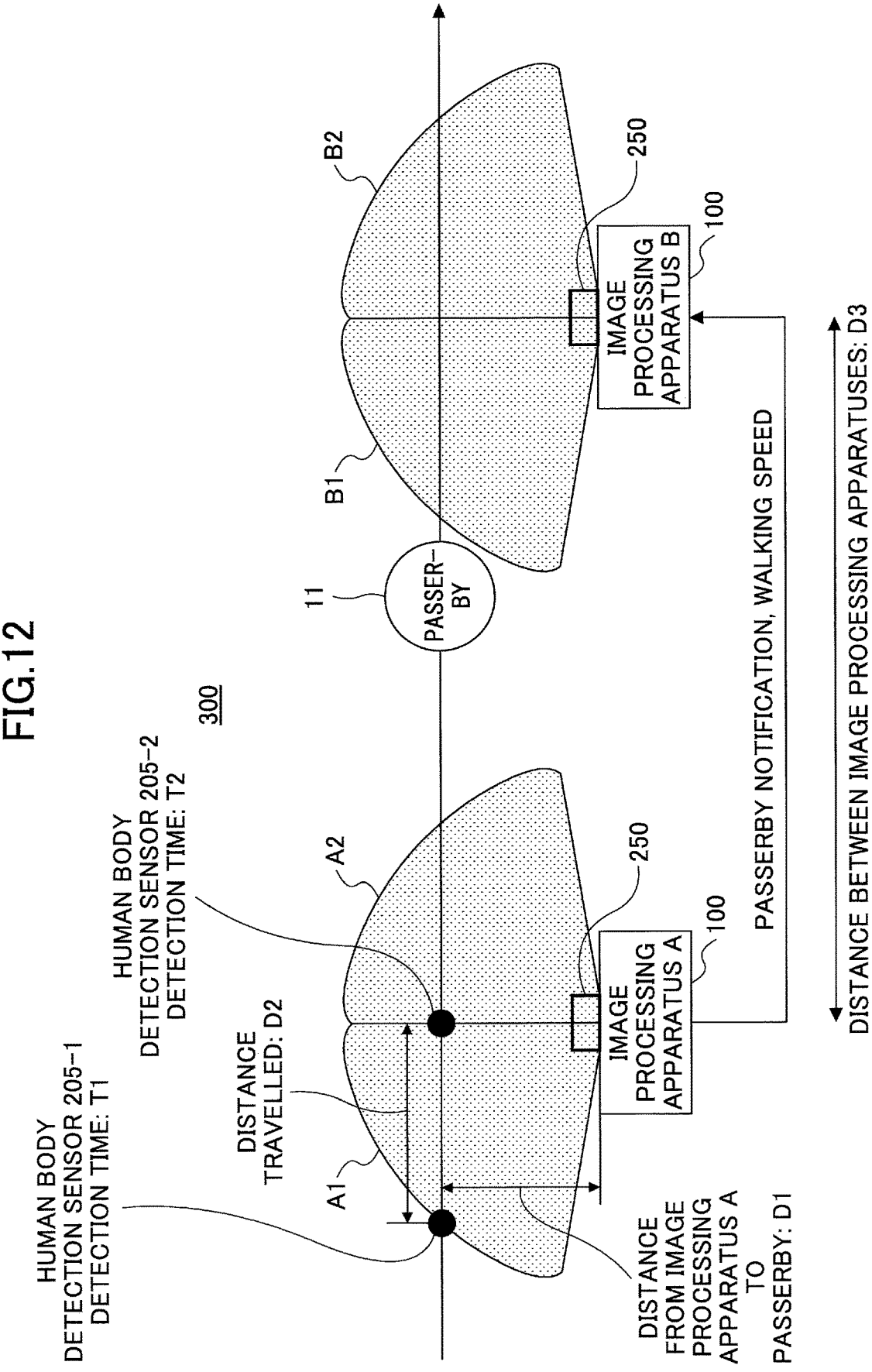
FIG. 12 is a diagram illustrating an example image processing system that is capable of taking into account a walking speed of a passerby.

In the following, methods for calculating the walking speed of a passerby and calculating the predetermined time will be described with reference to FIG. 12. FIG. 12 is a diagram illustrating an example of the image processing system 300 that is capable of taking into account the walking speed of the passerby 11.

In FIG. 12, the image processing apparatus A includes a distance sensor 250 that detects the distance D1 from the image processing apparatus A to the passerby 11. The distance sensor 250 may be a sonic sensor or a stereo camera, for example. In the present embodiment, the image processing apparatus A also records time T1 at which the human body detection sensor 205-1 starts detecting the passerby 11 and time T2 at which the human body detection sensor 205-2 starts detecting the passerby 11.

Based on the distance D1 and the shape of the detection range A1, the image processing apparatus A determines a distance D2 that the passerby 11 has travelled within the detection range A1. For example, the image processing apparatus A may include a table for determining the distance D2 based on the distance D1, or the image processing apparatus A may calculate the distance D2 based on the shape of the detection range A1.

Based on the times T1 and T2 and the distance D2, the image processing apparatus A can calculate the walking speed of the passerby 11. The image processing apparatus A may transmit the walking speed together with a passerby notification (or separately transmit the walking speed and the passerby notification) to the image processing apparatus B. The image processing apparatus B can determine the time it takes for the passerby 11 to reach the image processing apparatus B (required time to reach the image processing apparatus B) based on the walking speed acquired from the image processing apparatus A and a distance D3 between the image processing apparatuses A and B that is determined in advance.

After acquiring the passerby notification from the image processing apparatus A, the image processing apparatus B determines whether an operation on the image processing apparatus B has been detected within a predetermined time. The predetermined time can be calculated based on the walking speed and the distance D3. That is, predetermined time=distance D3/walking speed.

In this way, when the image processing apparatus B detects an operation performed thereon, it can more precisely distinguish the operation as that performed by the passerby 11 that has passed the detection ranges A1 and A2 of the image processing apparatus A or some other person. That is, if the image processing apparatus B detects an operation by another person and determines that it has been preferentially used over the image processing apparatus A, the image processing apparatus B would be erroneously determining that it has been preferentially-used even though it was not actually preferentially used over the image processing apparatus A. In this respect, by determining whether an operation has been detected within a predetermined time as in the example of FIG. 12, the image processing apparatus B may be prevented from erroneously determining that it has been preferentially-used.

FIG. 13 is a diagram illustrating an example functional configuration of the image processing apparatus 100 according to the second embodiment. Note that the following descriptions are mainly focused on functional features of FIG. 13 that differ from those of FIG. 4. In FIG. 13, the image processing apparatus A includes a walking speed calculating unit 19. The walking speed calculating unit 19 calculates the walking speed of the passerby 11 based on the times T1 and T2 and the distance D2 acquired from the human sensing signal processing unit 29. The walking speed calculating unit 19 may be implemented by the CPU 201 of FIG. 3 executing a program, for example.

Also, the image processing apparatus B includes a predetermined time calculating unit 38. The predetermined time calculating unit 38 calculates the predetermined time based on the walking speed received from the image processing apparatus A by the passerby notification receiving unit 36 and the distance D3 that is stored in advance. The predetermined time calculating unit 38 may be implemented by the CPU 201 of FIG. 3 executing a program, for example.

Figure 14:
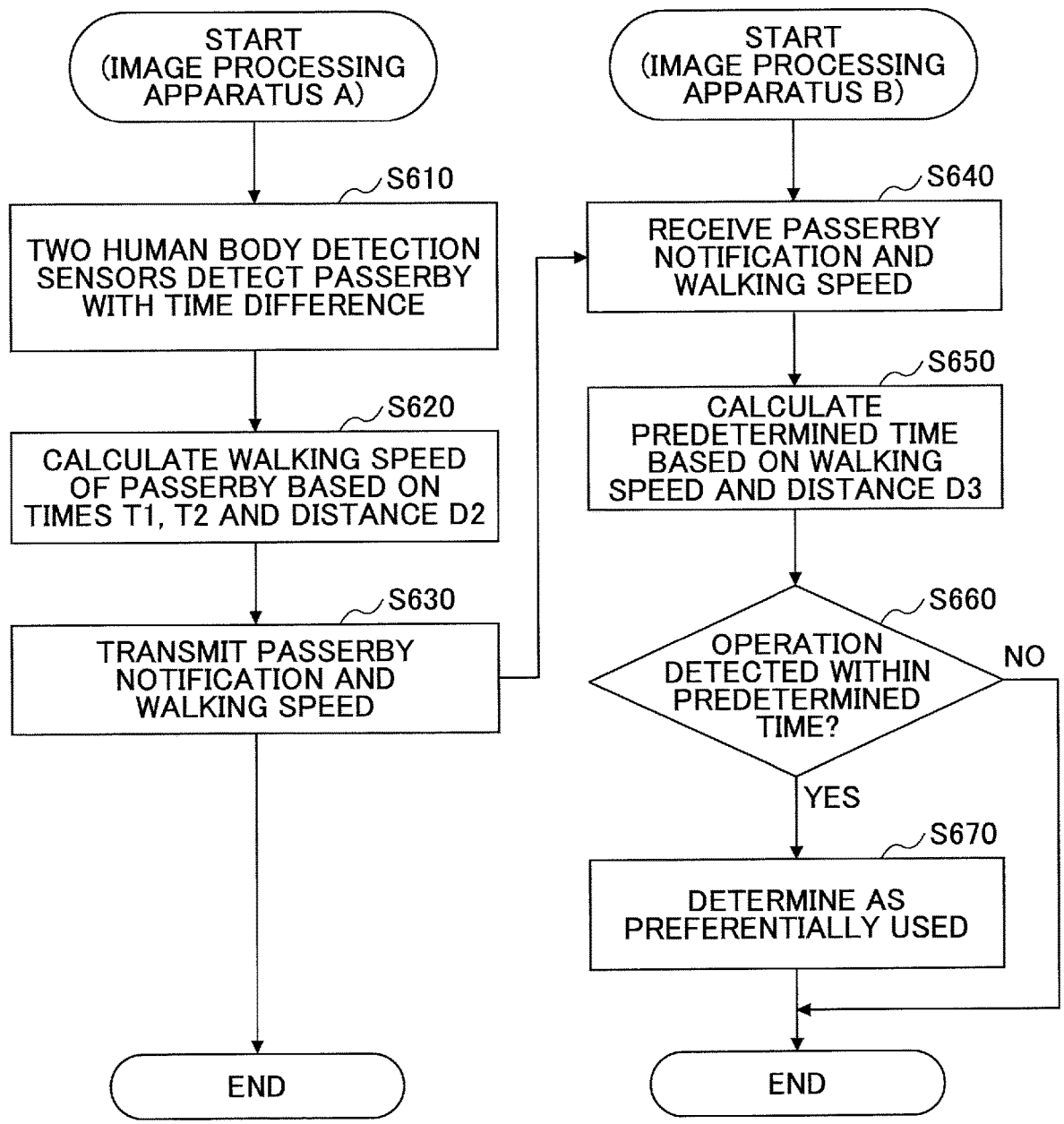
FIG. 14 is a flowchart illustrating an example process in which the image processing system calculates the walking speed and a predetermined time.

FIG. 14 is a flowchart illustrating an example process in which the image processing apparatuses A and B respectively calculate the walking speed and the predetermined time. The process of FIG. 14 may be started when a passerby is detected by the human body detection sensors 205.

In step S610, the direction determination unit 25 of the image processing apparatus A detects that the two human body detection sensors 205-1 and 205-2 have detected the passerby 11 with a time difference.

Then, the walking speed calculating unit 19 of the image processing apparatus A calculates the walking speed of the passerby 11 based on the times T1 and T2 at which the passerby 11 was detected by the human body detection sensors 205-1 and 205-2 and the distance D2 (step S620).

The passerby notification transmitting unit 27 of the image processing apparatus A transmits a passerby notification and the walking speed to the image processing apparatus B (step S630). Note that the image processing apparatus B corresponds to the image processing apparatus 100 in the travelling direction of the passerby 11.

On the other hand, the passerby notification receiving unit 36 of the image processing apparatus B receives the passerby notification and the walking speed from the image processing apparatus A (step S640).

Then, the predetermined time calculating unit 38 of the image processing apparatus B calculates the predetermined time based on the walking speed and the distance D3 that is stored in advance (step S650).

The preferential use counting unit 34 determines whether the operation detection unit 21 has detected an operation within the predetermined time after receiving the passerby notification (step S660). In this way, it can be determined whether the passerby 11 that passed the detection ranges A1 and A2 of the image processing apparatus A has reached the image processing apparatus B and used the image processing apparatus B.

If a positive determination (YES) is made in step S660, the use determination unit 33 determines that the image processing apparatus B has been preferentially used, and the preferential use counting unit 34 increments the preferential use count number by one (step S670).

As described above, by accurately calculating the predetermined time, the image processing system 300 according to the present embodiment can prevent the image processing apparatus B from erroneously determining that it has been preferentially used over the image processing apparatus A.

Other Application Examples

Although the present invention has been described above with respect to certain illustrative embodiments, the present invention is not limited to these embodiments and various modifications and substitutions may be made without departing from the scope of the present invention.

For example, in the above-described embodiments, the image processing apparatus 100 determines whether a person detected by the human body detection sensor 205 is a passerby. However, the present invention is not limited to being applied to the image processing apparatus 100 but may also be applied to various other information processing apparatuses that can operate in energy-saving mode while waiting to be operated, such as a ticket vending machine, an ATM (Automated/Automatic Teller Machine), a projector, and the like.

Also, note that the example configurations, such as FIG. 4 and FIG. 13, illustrate various process units based on the functions of the image processing apparatus 100 in order to facilitate understanding of processing by the image processing apparatus 100. However, the present invention is not limited to the above-described arrangement of processing units and the specific names assigned thereto. For example, the processing by the image process apparatus 100 can be divided into more process units according to the specific contents of the processing, for example. Also, one process unit may include further subdivided process units, for example.

Also, for example, the recovery condition/transition condition storage unit 31 and the notification destination storage unit 32 may be provided in the image processing apparatus 100 or in a device connected to a network, for example.

Also, note that the human sensing signal processing unit 29 of the above-described embodiment may be implemented by a processor of an information processing apparatus executing a process of detecting a passerby passing a detection range of a detection device of the information processing apparatus. The passerby notification transmitting unit 27 may be implemented by the processor executing a process of transmitting to another information processing apparatus, a passerby notification indicating that the detected passerby is approaching the other information processing apparatus. The use notification receiving unit 28 may be implemented by the processor executing a process of receiving from the other information processing apparatus, a use notification indicating that the other information processing apparatus has been used. The non-preferential use counting unit 26 may be implemented by the process executing a process of determining that the information processing apparatus has not been preferentially used upon receiving the use notification from the other information processing apparatus. The recovery transition control unit 23 may be implemented by the processor executing a process of changing a control related to power consumption of the information processing apparatus depending on whether the processor has determined that the information processing apparatus has not been preferentially used. Note that the image processing apparatus A is an example of the information processing apparatus in the present example, and the image processing apparatuses B and C are examples of the other information processing apparatus in the present example.

Also, the passerby notification receiving unit 36 may be implemented by a processor of an information processing apparatus executing a process of receiving from another information processing apparatus, a passerby notification indicating that a passerby that has passed a detection range of the other information processing apparatus is approaching the information processing apparatus. The operation detection unit 21 may be implemented by the processor executing a process of detecting an operation performed on the information processing apparatus. The preferential use counting unit 34 may be implemented by the processor executing a process of determining that the information processing apparatus has been preferentially used upon detecting the operation performed on the information processing apparatus within a predetermined time after receiving the passerby notification. The predetermined time calculating unit 38 may be implemented by the processor executing a process of calculating the predetermined time based on a walking speed of the passerby received from the other information processing apparatus and the distance between the other information processing apparatus and the information processing apparatus that is stored in advance.

Also, according to an example embodiment of the present invention, the detection range is formed by a plurality of sensors, and the processor determines a travelling direction of a person detected by a sensor from among the plurality of sensors, determines the direction of the other information processing apparatus that has transmitted the passerby notification with respect to the information processing apparatus, and determines whether the person detected in the detection range is the passerby depending on whether the travelling direction corresponds to the direction of the other information processing apparatus. Note that the image processing apparatus A is an example of the other information processing apparatus in the present example, and the image processing apparatuses B and C are examples of the information processing apparatus in the present example.

What is claimed is:

1. An information processing apparatus that is capable of communicating with another information processing apparatus, the information processing apparatus comprising:
   a detection device; and
   a processor configured to execute processes of
      detecting a passerby passing a detection range of the detection device that is formed in at least a part of a region surrounding the information processing apparatus;
      transmitting to the other information processing apparatus, a passerby notification indicating that the detected passerby is approaching the other information processing apparatus;
      receiving from the other information processing apparatus, a use notification indicating that the other information processing apparatus has been used;
      determining that the information processing apparatus has not been preferentially used upon receiving the use notification from the other information processing apparatus; and
      changing a control related to power consumption of the information processing apparatus depending on whether the processor has determined that the information processing apparatus has not been preferentially used more than a predetermined number of times,
   wherein both the information processing apparatus and the another information processing apparatus are image forming apparatuses.

2. The information processing apparatus according to claim 1, wherein
   the information processing apparatus is configured to operate in at least one of a second operation mode in which power consumption is reduced and a first operation mode in which power consumption is higher than the second operation mode; and
   when the processor determines that the information processing apparatus has not been preferentially used while the information processing apparatus is operating in the second operation mode, the processor turns off a power supply of the detection device.

3. The information processing apparatus according to claim 2, wherein
   when the processor receives an in-use notification indicating that the other information processing apparatus is in use while the power supply of the detection device is turned off, the processor turns on the power supply of the detection device.

4. The information processing apparatus according to claim 2, wherein
   when the processor determines that the information processing apparatus has not been preferentially used, the processor sets a transition time before transitioning from the first operation mode to the second operation mode to be shorter than a default value.

5. The information processing apparatus according to claim 1, wherein
   when the information processing apparatus is in a non-usable state that prevents the detected passerby from using the information processing apparatus, the processor refrains from transmitting the passerby notification to the other information processing apparatus.

6. The information processing apparatus according to claim 1, wherein the transmitting transmits the passerby notification from the information processing apparatus that is not preferentially used to the another information processing apparatus that is preferentially used.

7. An information processing apparatus that is capable of communicating with another information processing apparatus, the information processing apparatus comprising:
   a detection device; and
   a processor configured to execute processes of
      receiving from the other information processing apparatus, a passerby notification indicating that a passerby that has passed a detection range of the other information processing apparatus is approaching the information processing apparatus;
      detecting an operation performed on the information processing apparatus;
      determining that the information processing apparatus has been preferentially used upon detecting the operation performed on the information processing apparatus within a predetermined time after receiving the passerby notification from the other information processing apparatus; and
      changing a control related to power consumption of the information processing apparatus depending on whether the processor has determined that the information processing apparatus has been preferentially used more than a predetermined number of times,
   wherein both the information processing apparatus and the another information processing apparatus are image forming apparatuses.

8. The information processing apparatus according to claim 7, wherein the information processing apparatus is configured to operate in at least one of a second operation mode in which power consumption is reduced and a first operation mode in which power consumption is higher than the second operation mode; and when the processor determines that the information processing apparatus has been preferentially used, the processor sets a transition time before transitioning from the first operation mode to the second operation mode to be longer than a default value.

9. The information processing apparatus according to claim 7, wherein the processor further executes processes of
receiving a walking speed of the passerby from the other information processing apparatus;
calculating the predetermined time based on the walking speed received from the other information processing apparatus and a distance between the other information processing apparatus and the information processing apparatus, the distance being stored in the information processing apparatus in advance; and
determining whether the information processing apparatus has been preferentially used based on the calculated predetermined time.

10. An information processing system comprising:
a first information processing apparatus; and
a second information processing apparatus that is capable of communicating with the first information processing apparatus;
wherein the first information processing apparatus includes a first detection device and a first processor that is configured to execute processes of
detecting a passerby passing a detection range of the first detection device that is formed in at least a part of a region surrounding the first information processing apparatus;
transmitting to the second information processing apparatus, a passerby notification indicating that the detected passerby is approaching the second information processing apparatus;
receiving from the second information processing apparatus, a use notification indicating that the second information processing apparatus has been used;
determining that the first information processing apparatus has not been preferentially used upon receiving the use notification from the second information processing apparatus; and
changing a first control related to power consumption of the first information processing apparatus depending on whether the first processor has determined that the first information processing apparatus has not been preferentially used more than a predetermined number of times; and wherein the second information processing apparatus includes a second detection device and a second processor that is configured to execute processes of
receiving the passerby notification from the first information processing apparatus;
detecting an operation performed on the second information processing apparatus;
determining that the second information processing apparatus has been preferentially used upon detecting the operation performed on the second information processing apparatus within a predetermined time after receiving the passerby notification from the first information processing apparatus;
changing a second control related to power consumption of the second information processing apparatus depending on whether the second processor has determined that the second information processing apparatus has been preferentially used more than predetermined times, wherein both the first information processing apparatus and the second information processing apparatus are image forming apparatuses.

\* \* \* \* \*